US006995667B2

(12) United States Patent
He et al.

(10) Patent No.: US 6,995,667 B2
(45) Date of Patent: Feb. 7, 2006

(54) SYSTEMS, METHODS, AND COMPUTER PROGRAM PRODUCTS FOR AUTOMATIC TRACKING AND/OR REMOTE MONITORING OF NUCLEAR GAUGES AND/OR DATA COMMUNICATION THEREWITH

(75) Inventors: Tianqing He, Cary, NC (US); Peter D. Muse, Durham, NC (US); Ali Regimand, Raleigh, NC (US); Lawrence H. James, Raleigh, NC (US)

(73) Assignee: InstroTek, Inc., Raleigh, NC (US)

( * ) Notice: Subject to any disclaimer, the term of this patent is extended or adjusted under 35 U.S.C. 154(b) by 171 days.

(21) Appl. No.: 10/328,063

(22) Filed: Dec. 23, 2002

(65) Prior Publication Data

US 2005/0253703 A1    Nov. 17, 2005

(51) Int. Cl.
*C08B 1/08* (2006.01)
*H04Q 7/00* (2006.01)
(52) U.S. Cl. .......................... 340/539.13; 342/357.06; 342/357.07; 342/357.12; 342/357.13
(58) Field of Classification Search ........... 340/539.13; 342/357.17, 357.15, 357.13, 357.12, 357.04, 342/357.08, 357.07, 357.06
See application file for complete search history.

(56) References Cited

U.S. PATENT DOCUMENTS

| | | | |
|---|---|---|---|
| 3,636,323 A * | 1/1972 | Salisbury et al. ........... 701/220 |
| 4,152,600 A | 5/1979 | Berry .......................... 250/505 |
| 4,188,535 A | 2/1980 | Wilson et al. ............... 250/359 |
| 4,525,854 A | 6/1985 | Molbert et al. ............... 378/89 |
| 4,587,623 A | 5/1986 | Regimand et al. .......... 364/571 |
| 4,641,030 A | 2/1987 | Regimand .................... 250/308 |
| 4,701,868 A | 10/1987 | Regimand .................... 364/558 |
| 4,766,319 A * | 8/1988 | Regimand .............. 250/390.05 |
| 4,876,454 A * | 10/1989 | Burgess .................. 250/370.14 |
| 4,979,197 A | 12/1990 | Troxler, Sr. et al. .......... 378/90 |
| 5,347,274 A * | 9/1994 | Hassett ....................... 340/988 |
| 5,825,283 A * | 10/1998 | Camhi ........................ 340/438 |
| 5,923,726 A | 7/1999 | Regimand ................... 378/207 |
| 5,957,773 A | 9/1999 | Olmsted et al. ............... 460/7 |
| 5,969,595 A * | 10/1999 | Schipper et al. ....... 340/426.19 |
| 6,003,809 A * | 12/1999 | Honigsbaum .............. 244/3.15 |
| 6,050,725 A | 4/2000 | Regimand ................... 378/207 |
| 6,073,488 A | 6/2000 | Byatt et al. ............... 73/307 C |
| 6,122,601 A | 9/2000 | Swanson et al. |
| 6,206,108 B1 | 3/2001 | MacDonald et al. .......... 175/24 |
| 6,480,147 B2 * | 11/2002 | Durst et al. ............ 342/357.07 |
| 2004/0073382 A1 | 4/2004 | Troxler et al. |
| 2004/0124977 A1 * | 7/2004 | Biffar .................... 340/539.13 |

FOREIGN PATENT DOCUMENTS

GB          2255177 A    * 10/1992

* cited by examiner

*Primary Examiner*—Daniel Wu
*Assistant Examiner*—Samuel J. Walk
(74) *Attorney, Agent, or Firm*—Myers Bigel Sibley & Sajovec PA

(57) ABSTRACT

Methods, systems, and computer program products configured to track the geographic location of hazmat substances or devices including same, such as nuclear gauges with a radioactive component, include mounting a tracking device in proximity to the substance, the tracking device configured to provide at least one tracking signal that is detectable from a remote location to thereby allow its geographic location to be determined remotely.

58 Claims, 19 Drawing Sheets

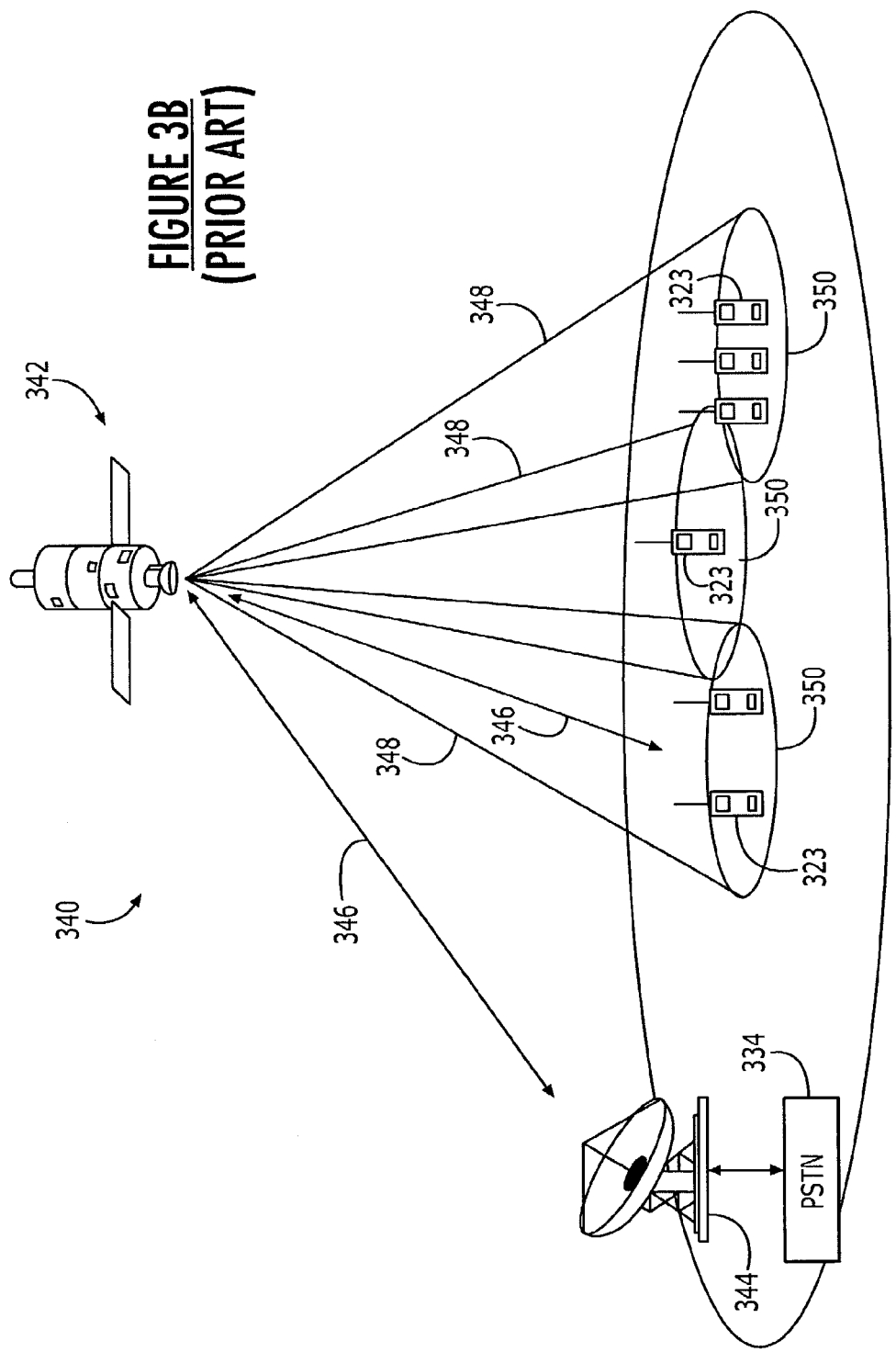

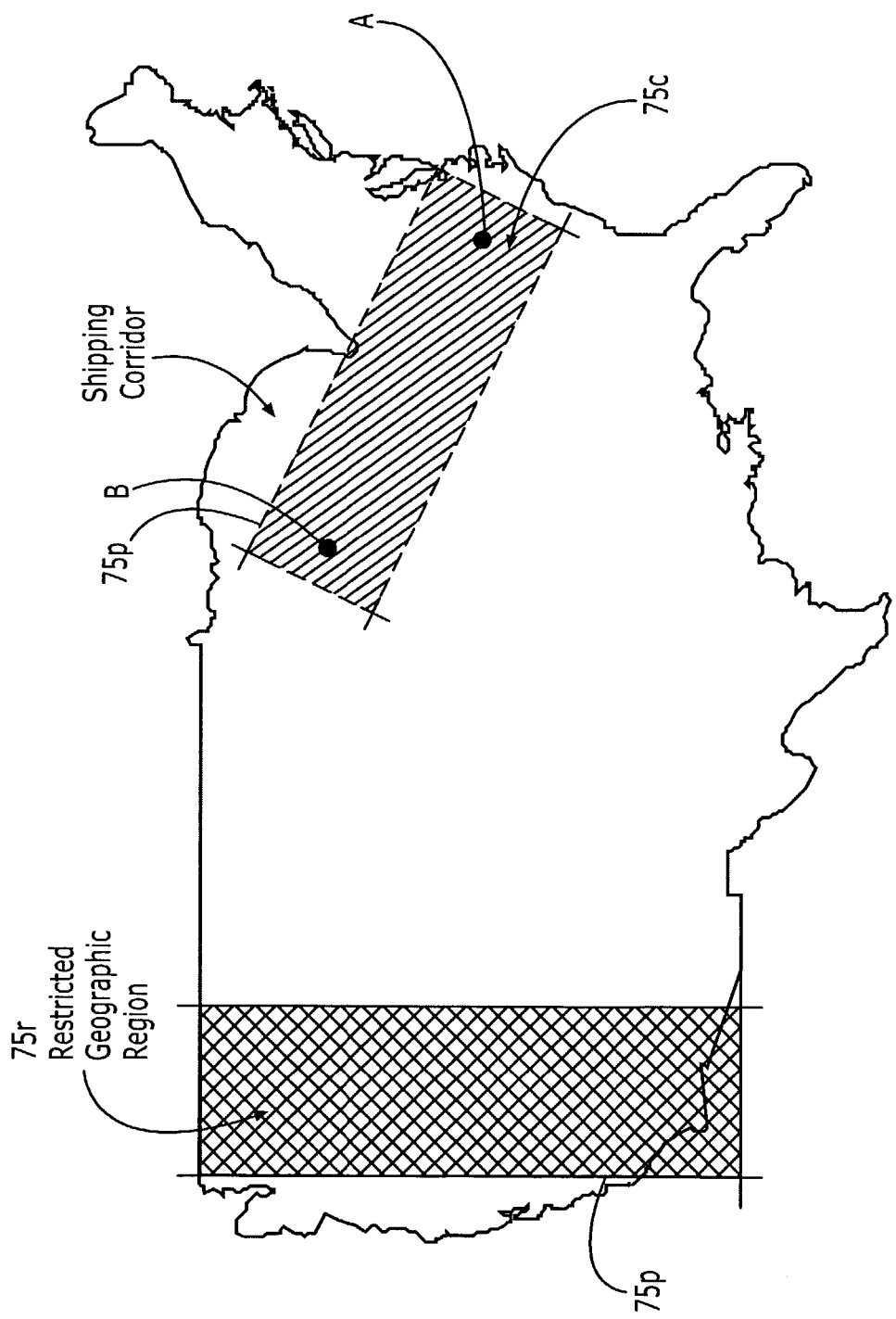

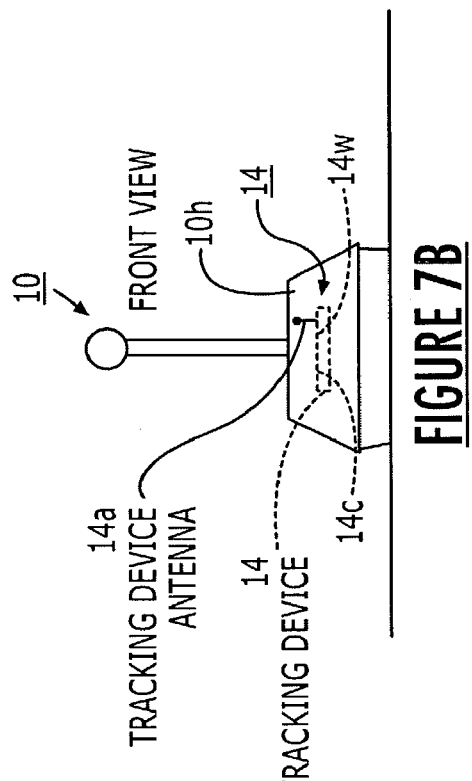
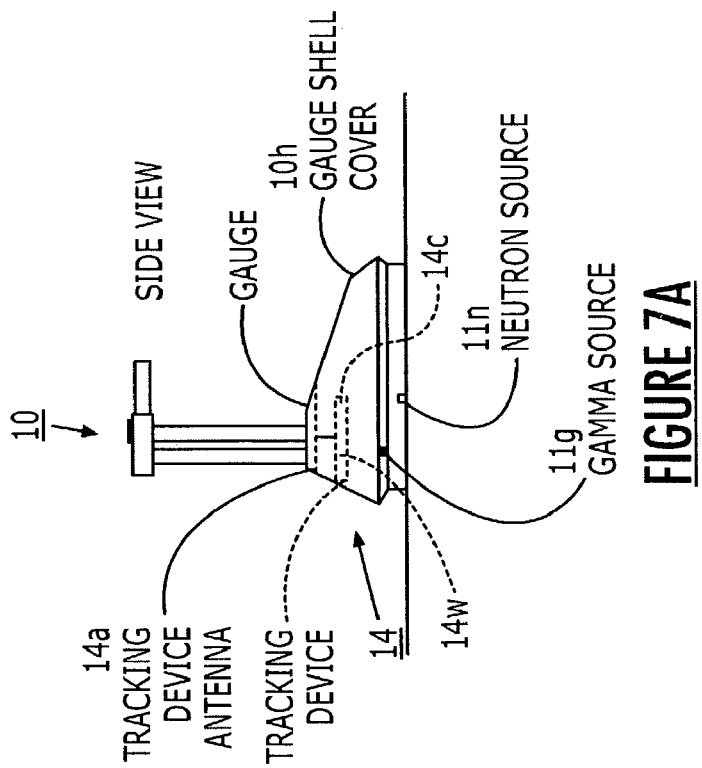

TRACKING DEVICE IN NUCLEAR MEASUREMENT GAUGE

SYSTEMS, METHODS, AND COMPUTER
PROGRAM PRODUCTS FOR AUTOMATIC
TRACKING AND/OR REMOTE
MONITORING OF NUCLEAR GAUGES
AND/OR DATA COMMUNICATION
THEREWITH

FIELD OF THE INVENTION

This invention is related to portable nuclear gauges, and may be particularly suitable for use with portable nuclear gauges used to assess material properties in the construction and raw materials industries.

BACKGROUND OF THE INVENTION

Nuclear gauges are routinely used for the determination of certain material properties. For example, portable nuclear gauges are used in the construction industry to determine density and/or moisture content of asphalt paving materials, soil and concrete. In process-oriented industries, such as the pulp and paper industry, nuclear gauges can be used to determine liquid level, moisture and density of liquid mixtures, pulp and raw wood. In metal industries, nuclear gauges can be used to determine metal thickness and metal composition.

Nuclear gauges, typically, include one or more radioactive sources. Regulatory agencies typically require that nuclear gauges be monitored on a relatively routine basis to protect against mishandling, theft, and inadvertent loss or control that can occur, particularly during shipment or transport. In addition, regulations also exist to attempt to prevent a user from moving the radioactive source from one gauge to another in the field.

In view of the above, there is a need to more actively and accurately monitor the location of the nuclear gauges to meet regulatory guidelines and/or to provide improved safety and security protocols.

SUMMARY OF THE INVENTION

Embodiments of the present invention provide methods, systems, devices, and computer program products that can track and remotely monitor the location of devices using or storing hazardous materials ("hazmat") or devices employing same, such as nuclear gauges, and/or identify whether the hazmat item is intact and/or in a projected geographical region. Embodiments of the present invention can be particularly useful for monitoring and/or tracking nuclear gauges with radioactive source(s) as well as transfer of information or data, such as measurement or calibration data, to and from the gauge to a remote site.

Certain embodiments of the present invention provide for tracking the location of nuclear gauges comprising a radioactive component by mounting a tracking device in proximity to a nuclear gauge having a radioactive component. The tracking device is configured to provide at least one tracking signal that is detectable from a remote location to thereby allow its geographic location to be determined remotely.

The tracking device may be configured to transmit the signal from a local site proximate to the nuclear gauge (typically on or in the housing of the gauge) to a remote tracking station. The tracking device may also be configured to operate using wireless communications and/or a global positioning system. In addition, the tracking device may be configured to detect the number of counts associated with the radioactive source in the device (during a non-active measurement or operational period); and compare the detected count to a predetermined value to determine whether the radioactive source is intact in the device. As such, the detection and comparison can be carried out proximate in time to when the tracking signal is generated to dynamically confirm the presence of the radioactive component in the device at the time that the location is being verified.

In particular embodiments of the present invention, the nuclear gauge is a nuclear measurement gauge with both a gamma source and a neutron source and the tracking device is configured to generate an alert and/or alarm when it is determined that the radioactive source has been removed from the nuclear gauge housing.

In certain embodiments of the present invention, at least one geographic virtual fence region associated with the nuclear gauge is defined and the location of the nuclear gauge monitored to determine whether the device remains within the geographic fence. The virtual fence can be a projected shipping corridor associated with the transport of the nuclear gauge from one site to a different site and/or a defined use region or regions.

In particular embodiments of the present invention, an alarm and/or alert can be automatically generated and transmitted to authorities upon detection of a predetermined operative and/or inoperative condition of the gauge, a missing radioactive component, when the gauge is outside the virtual fence, and/or when the tracking signal is unable to be obtained.

In yet other embodiments of the present invention, the operation of the tracking device and/or the nuclear gauge is remotely controlled. For example, the remote control can include one or more of: relaying measurement data proximate in time to the collection thereof to a remote location; transmitting diagnostics or other selected data from the nuclear device to the remote location; activating and deactivating the nuclear gauge and/or the tracking device. The measurement data can include calibration data for updating for drift and the like.

In other embodiments of the present invention, the internal circuitry of the nuclear gauge is disabled upon the occurrence of at least one predetermined condition In further embodiments of the present invention a nuclear measurement device includes a housing and radioactive source held inside of the housing. The device includes at least one radioactive detector, such as, but not limited to, a Geiger Mueller counter and heliucm-3 detector, operably associated with the radioactive source(s); electronic circuitry that controls the operation of the nuclear gauge operably associated with the detector(s); a power source operably associated with the detector(s) and the controller; and a wireless communication system held in or proximate to the housing. The wireless communication system can be configured to provide a tracking signal that allows a remote location to determine the geographic location of the gauge.

In certain embodiments of the present invention, the wireless communication system is configured to obtain a radioactive count from the detector during a non-active measurement period to determine whether the radioactive source is intact in the gauge. The non-active measurement can be obtained proximate in time to providing the tracking signal. The device may also include a source count comparator module that compares the non-active measurement count to a predetermined value to assess whether the radioactive source is in the gauge.

In particular embodiments of the present invention, the gauge includes an anti-theft module that is in communication with the operational electronic circuitry that disables selected components in the electronic circuitry upon the occurrence of predetermined conditions. In certain embodiments, the anti-theft module generates an audible alarm when the radioactive source is determined to be missing from or displaced in the gauge.

In still further embodiments of the present invention, the wireless communication system is configured to operate over a terrestrial communication system and/or a celestial communication system.

In particular embodiments, the nuclear gauge can include a shipping container configured to enclose the nuclear measurement gauge therein and the wireless communication system can be held on or in the shipping container in other embodiments, or in addition thereto, the wireless communication system is integrated into the electronic operating circuitry of the gauge.

In further embodiments of the present invention, the wireless communication system can comprise a primary circuit board and an antenna and the wireless communication system can be configured to communicate with the electronic circuitry. The wireless communication system may also include a remote control interface module that allows a remote location to control or obtain data from the nuclear measurement gauge.

Still other embodiments of the present invention provide for tracking the location of hazardous materials by (a) assigning a unique identifier to each of a plurality of hazardous material samples to be tracked; (b) mounting a tracking device proximate to a container configured to hold respective samples of the hazardous materials undergoing tracking; (c) obtaining at least one tracking signal for each of the hazardous material samples; and (d) remotely determining the geographical location of each of the hazardous material samples over time.

In particular embodiments of the present invention, the tracking device is mounted so that the tracking device is disposed on or in the container. The tracking device may, for example, be positioned in different, possibly random, locations proximate to the container, sample to sample.

As will be appreciated by those of skill in the art in light of the present disclosure, the present invention may be embodied as methods, systems, devices and/or computer program products.

BRIEF DESCRIPTION OF THE DRAWINGS

FIG. 3B is a schematic illustration of a conventional satellite communication system.

FIG. 4 is a map with geographically restricted use regions for monitoring the location or transport of hazmat items and/or nuclear gauges according to embodiments of the present invention.

FIG. 5 is a map of a territorial or geographically segmented global monitoring system according to embodiments of the present invention.

FIG. 7A is a side view of a nuclear measurement gauge with a tracking device integrated therein according to embodiments of the present invention.

FIG. 7B is an end view of the device shown in FIG. 7A.

DESCRIPTION OF EMBODIMENTS OF THE INVENTION

Figure 1:
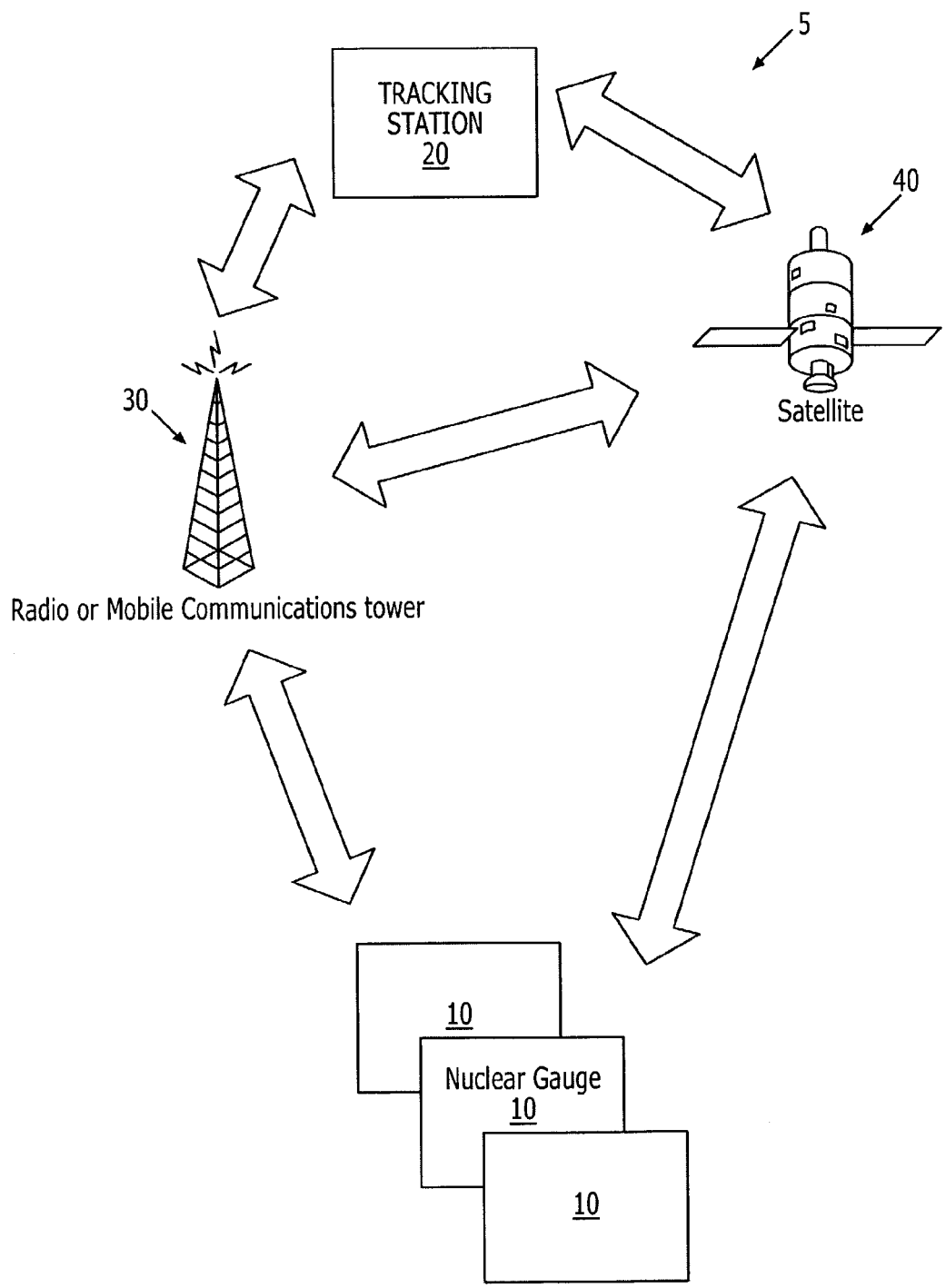
FIG. 1 is a schematic illustration of a tracking or monitoring system of hazardous materials according to embodiments of the present invention.

The present invention will now be described more fully hereinafter with reference to the accompanying figures, in which embodiments of the invention are shown. This invention, however, should not be construed as limited to the embodiments set forth herein. Like numbers refer to like elements throughout. In the block and schematic diagrams, broken lines indicate such operation or feature is optional unless stated otherwise.

Nuclear gauges are the standard measurement devices used to obtain density and/or moisture measurements in construction or roadway projects. Nuclear density gauges operate using a relatively small radioactive source or sources that can generate a suitable detectable count and a detection system. When placed on test material, the photons from the nuclear source penetrate the test material. A fraction of the photons will interact with the material and scatter to the gauge base where they are detected by Geiger Mueller detectors. The number of photons scattered back and counted by the detector(s) is proportional to the density of the test material. Nuclear gauges, typically, can operate in either a backscatter or direct transmission mode. In the backscatter mode, the gauge is placed on the test material with the radioactive source and detectors in the same plane. In operation, the photons from the source penetrate the material from the surface and scatter to the detectors. In the direct transmission mode, the test material, a hole larger than the diameter of the source rod is formed in material (typically soil) and the source is inserted into the material at one or more predetermined depths. In the direct transmission mode, the material is located directly in the path between the source rod and the detectors. Examples of manufacturers of construction nuclear gauges include Humboldt Scientific, Inc. of Raleigh, N.C., Campbell Pacific Nuclear (CPN) of Martinez, Calif., Seaman Nuclear of Milwaukee, Wis., and Troxler Electronic Laboratories, Inc. of Research Triangle Park, N.C. See also U.S. Pat. Nos. 4,188,535; 4,525,854; 4,641,030; 4,701,868; 4,979,197; 4,701,868; 4,152,600; 4,587,623; 5,923,726; and 6,050,725, which discuss nuclear gauges, the contents of which are hereby incorporated by reference as if recited in full herein.

Nuclear devices and gauges are also used in processing industries as described in the background, typically for automatic or semi-automatic control of process operations or assessment of targeted environments or material properties. See e.g., U.S. Pat. Nos. 6,206,108 (Drilling system); 6,073,488 (Capacitive liquid level sensor); and 5,957,773 (Measuring Grain characteristics), the contents of which are hereby incorporated by reference as if recited in full herein.

The radioactive sources of the nuclear gauges can be divided into the following categories, gamma ray, neutron, beta, and x-ray. The design, size, configuration, and radioactive strength of the radioactive sources and/or detectors can vary in different applications, but nuclear gauges, generally, share a common feature, one or more radioactive sources that when used improperly or if unshielded or removed (intentionally or unintentionally) from its intended device, can expose the environment and/or people to unwanted radiation.

Gamma ray gauges have been used as level gauges in the chemical industry and depend on having a source on one side of the holding tank and a detector on the other. Examples of radioactive gamma sources (for processing industry application and/or the construction industry gauges) include Cobalt-60 and Cesium-137.

Examples of gamma ray based nuclear level gauges include systems which employ one or more of a point source-point detector, a line source-point detector, a line detector-point source, and a line detector-line source. Nominal size of tanks can be in the range of about 5 to 6 ft in diameter and 20 to 30 ft in depth.

Neutrons have also been used in the pulp and paper industry to measure moisture content of wood chips based on neutron thermalization and detection of thennal neutrons. In addition, this industry can also use gamma ray gauges to determine when a tank is full of wood chips. X-rays are used in various industries to determine elemental composition through X-ray fluorescence. One exemplary processing industry that employs such devices is the coal industry.

Fast neutrons have also been used to determine elemental composition though the process of neutron activation analysis. When a material is bombarded with a high flux of fast neutrons some are absorbed by an atom creating an unstable isotope. When this isotope decays it will emit a gamma ray which will be a signature of that particular element. By counting the different gamma rays from different decaying atoms the elemental composition of the material may be estimated. Beta particles are essentially electrons. These particles have been used to determine the thickness of aluminum in aluminum processing industries.

Although particularly suitable for use with nuclear gauges that employ nuclear or radioactive materials, embodiments of the present invention may alternatively be used to track or monitor other devices that transport, house, use or carry hazardous materials (hazmat). Examples of such hazardous materials include, but are not limited to, radioactive energy sources, radioactive waste such as "spent" nuclear fuel rods, toxic or hazardous chemicals, biological toxins or medical waste, and the like. However, for ease of discussion, the description that follows will be discussed primarily with reference to nuclear gauge instruments that employ one or more radioactive sources.

In the description that follows, the monitored device will be primarily discussed with respect to a nuclear gauge 10 for clarity and/or ease of description. However, the description is not limited thereto and the operation and/or features can apply to other containers or devices employing hazardous materials including, but not limited to, radioactive materials.

Referring to FIG. 1, a monitoring system 5 can be used to establish the location of the nuclear gauge 10. The monitoring system 5 provides a wireless tracking and/or communication system between a remote tracking station 20 and a plurality of different nuclear gauges 10. The nuclear gauge 10 can be monitored during normal field use, storage at a storage site such as a distributor, regional or state warehouse, or OEM facility, or while being transported to and/or from a storage, distributor or OEM site (such as to a use or distributor location). The monitoring may be carried out at increased intervals when movement from either a known or previous location is detected or planned. The devices may be particularly prone to theft during transport. In addition, the carrier itself may be tracked or used as a relay station for the devices it carries. The system 5 may be configured to define virtual geographical fences 75$p$ to alert when a device travels outside its planned use district or transport corridor (FIGS. 4 and 5) as will be discussed further below.

Figure 2:
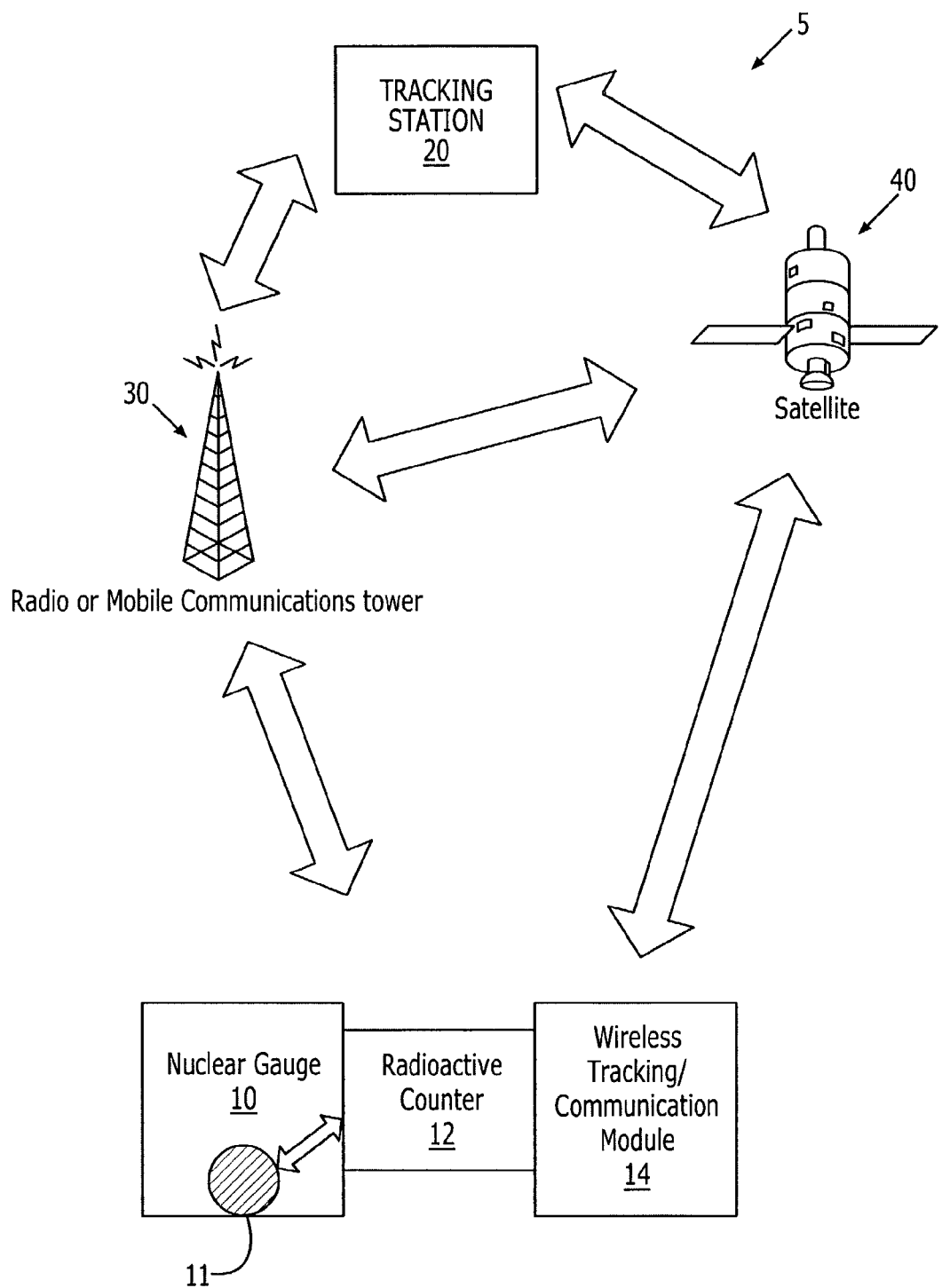
FIG. 2 is a schematic illustration of a tracking or monitoring system for nuclear gauges according to embodiments of the present invention.

The monitoring can be carried out using any suitable tracking technology. For example, as shown in FIGS. 1 and 2, one or more of cellular or mobile telephone and/or global communication technology with mobile communications towers 30 and/or one or more satellites 40. The arrows in FIGS. 1 and 2 illustrate that communication can occur in several ways between the components. The monitoring can be intermittent, semi-continuous or substantially continuous. The remote tracking station 20 can be located at a single tracking site or at selected ones of multiple tracking sites. The remote tracking station 20 can be connected to a regional or global computer network such as the world wide web or internet. The remote tracking station 20 can be an automated network of computers that monitors a plurality of different nuclear gauges 10 and automatically generates an audible alert or transmits a warning to law enforcement offices when irregular activity is detected.

Each nuclear gauge 10 can be assigned a unique identifier, such as an alphanumeric identifier or serial number, that correlates its ownership and product information in the monitoring system 5. The system 5 can be configured to obtain the geographic locational data at suitable intervals and provide hourly, daily, weekly, monthly or other summary records of the location of each nuclear gauge. The geographic data may be obtained automatically, for example, through the use of a global positioning system (GPS). At times of increased activity or interest, the interval can be adjusted to provide increased interrogation. Similarly, an increased number of interrogations can be instituted for gauges 10 located in high-risk regions or zones or when a particular user wants such increased surveillance. The summary records can be provided electronically in relatively real time to one or more recipient addresses and/or by project, owner, region, or other sort criteria of interest. In addition, for registered owners, inventories and locations of their particular gauges can be reported in desired regulatory reporting intervals and formats.

If during polling or interrogation of a location of a particular nuclear gauge 10, no signal is received or detected, the system can immediately retry or retry to obtain a signal within a shortened polling period relative to its normal polling interval. The system can identify the last known location and the time and/or day at its last known location. The system may also automatically relay a telephone message and/or computer message to the registered owners and/or responsible personnel about the loss in signal and potential loss of the device itself. Thus, tracking on a fairly routine basis can give owners or enforcement agents more positional accuracy for devices that may have their monitoring circuitry intentionally (or accidentally) disabled.

Examples of suitable location monitoring techniques will be discussed further below.

Referring to FIG. 2, in certain embodiments, the system 5 can be configured with a wireless tracking and/or communication module 14 and a detector 12 (shown as a radioactive or Geiger counter) to obtain dynamic and/or active readings associated with the operative or physical state of the device 10 to confirm that the radioactive source 11 remains intact. In operation, the radioactive monitoring can be carried out by obtaining a radiation count during the locational interrogation by detecting and relaying the count of a detector 12 positioned in proximity to the radioactive source 11 via the wireless tracking and/or communication module 14 to one or more remote stations 20. For devices 10 that have on-board Geiger counters, the counters can be used to obtain the desired radioactive confirmation readings. In other embodiments, a supplemental Geiger counter or other suitable detection device 12 can be configured to obtain the desired confirmation data. Typically, about 100–200 counts per minute are generated during a background reading of a typical nuclear gauge. Thus a reading of 10–50 may indicate a portion of the radioactive source has been removed or stolen. For devices employing two different radioactive sources, two different detectors can be used, one for each, or a cumulative detection counter can be used to determine whether the appropriate amount of radiation is present corresponding to both sources.

While FIG. 2 illustrates a radioactive material detection device, other hazardous material detection devices could also be utilized. For example, in certain applications, a pH sensor can be used to determine if the hazmat material is held in an undiluted form in the container. In other situations, a scale can be employed to indicate when the mass or volume has been decreased. Level sensors can be used for liquid based hazmat materials. Pressure gauges can be used when the material is enclosed under pressure. Other material property or physical sensors can be used as suited to the application and material being tracked.

In certain embodiments, the device 10 may include displacement sensors such as transducers, scales, optic sensors, or infrared systems and the like that can be used to indicate when the radioactive source has been extricated or removed from a predefined space such as the boundary of the device.

In particular embodiments, the device 10 can be configured so that it includes an anti-theft circuit (110, FIG. 9) that disables or destroys the operational usefulness of the device 10 if someone attempts to remove the radioactive source 11 from the device. This configuration may make it disadvantageous for a user to transfer radioactive sources 11 between gauges 10. Further, the anti-theft circuit can be configured to alert the remote location (and/or generate an audible local alert) when the radioactive source 11 moves beyond a predetermined distance in the device and/or moves outside the boundary of the device housing. In certain gauges, the radioactive source is expected to move certain distances in operation. Thus, the inactive count measurement and/or positional verification assessment can be configured to take these actions into consideration.

In certain embodiments, the remote station 20 can be configured to control the operation of the nuclear gauge 10. As such, the local device 10 can be configured with an interface module that allows remote operational control of the device, such as activation or deactivation of the Geiger counter 12, power source, relay or dynamic or substantially real time measurement data, diagnostic information, calibration data, other data transfer, and the like.

As will be discussed further below, the tracking circuitry or components can be provided as a kit of components of hardware and software that can be installed by users, can be integrated into the nuclear gauge itself (via the kit of components or at the OEM facility) and/or disposed within the shipping container (during shipping or transport). The tracking components can be positioned in various random locations within the device 10 so that the hardware is not positioned in a known or predictable location, thereby making it more difficult for someone to attempt to remove the tracking hardware or software from the device 10.

As discussed above, embodiments of the present invention may incorporate both a communications device and a position determination device. The communications device may be wireless or wired, analog or digital and may include a satellite communications device, a wireless communications device, a wireless networking device, a wired communications device and/or a wired networking device. Similarly, the position determination device may be any suitable device for determining the position of the monitoring device, either within a localized geographic region, such as building, city, state or the like, or anywhere on the globe. Such position determining devices may be incorporated with the communications device or may be a separate device, such as a global positioning device, or may be a combination of a separate device and the communications device.

In particular embodiments of the present invention, the communications device is a wireless communication device for operation in a wireless communication system. Wireless communication systems (networks) are commonly employed to provide voice and data communications to subscribers. For example, analog cellular radiotelephone systems, such as those designated AMPS, ETACS, NMT-450, and NMT-900, have long been deployed successfully throughout the world. Digital cellular radiotelephone systems such as those conforming to the North American standard IS-54 and the European standard GSM have been in service since the early 1990's. More recently, a wide variety of wireless digital services broadly labeled as PCS (Personal Communications Services) have been introduced, including advanced digital cellular systems conforming to standards such as IS-136 and IS-95, lower-power systems such as DECT (Digital Enhanced Cordless Telephone) and data communications services such as CDPD (Cellular Digital Packet Data). These and other systems are described in *The Mobile Communications Handbook*, edited by Gibson and published by CRC Press (1996).

Figure 3A:
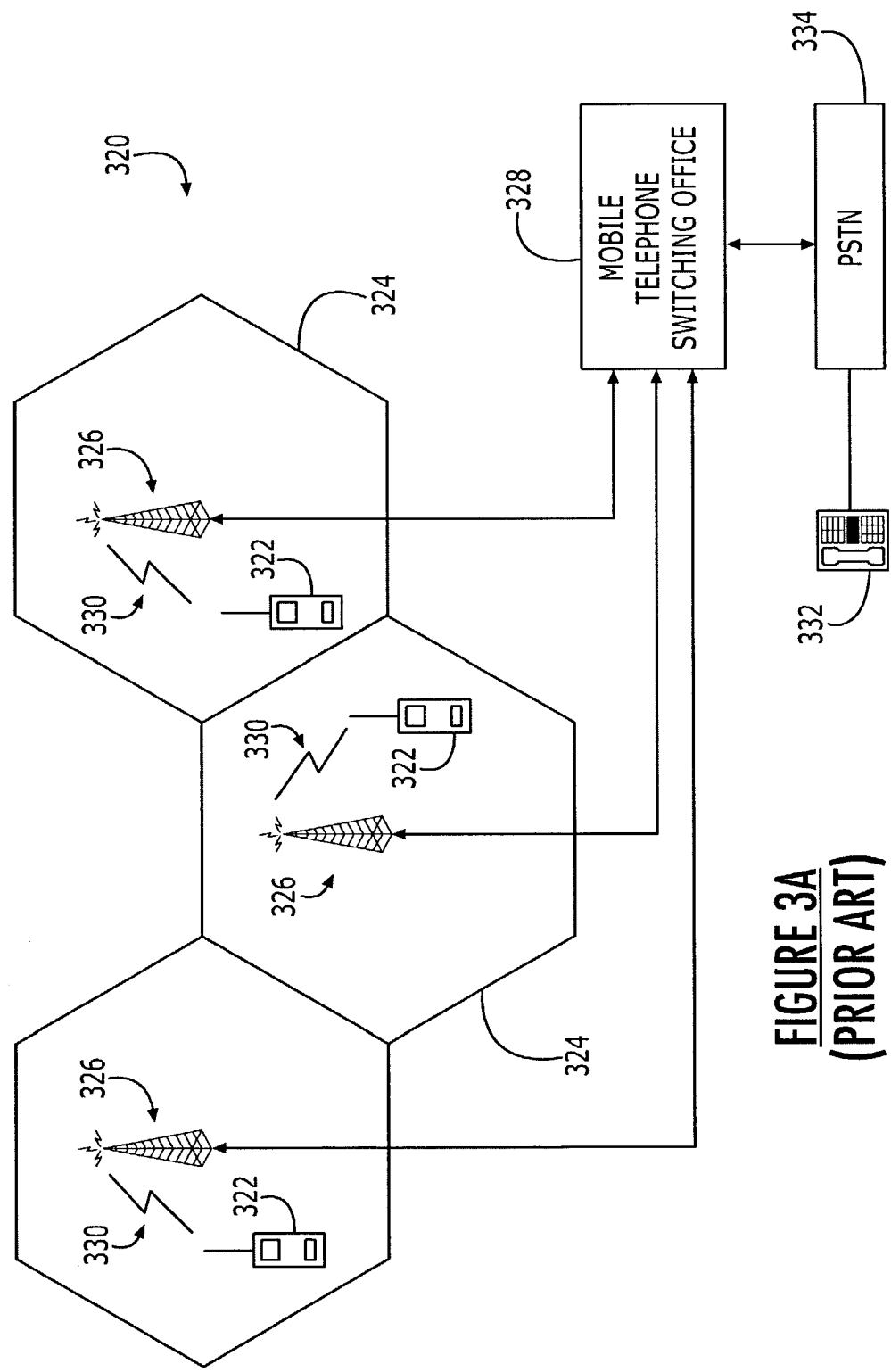
FIG. 3A is a schematic illustration of a conventional terrestrial communication system.

FIG. 3A illustrates a conventional terrestrial wireless communication system 320 that may implement any one of the aforementioned wireless communications standards. The wireless system may include one or more wireless mobile terminals (stations) 322 that communicate with a plurality of cells 324 served by base stations 326 and a mobile telephone switching office (MTSO) 328. Although only three cells 324 are shown in FIG. 3A, a typical cellular radiotelephone network may comprise hundreds of cells, and may include more than one MTSO 328 and may serve thousands of wireless mobile terminals 322.

The cells 324 generally serve as nodes in the communication system 320, from which links are established between wireless mobile stations (terminals) 322 and a MTSO 328, by way of the base stations 326 servicing the cells 324. Each cell 324 will have allocated to it one or more dedicated control channels and one or more traffic channels. The control channel is a dedicated channel used for transmitting cell identification and paging information. The traffic channels carry the voice and data information. Through the communication system 320, a duplex radio communication link 330 may be effectuated between two wireless mobile stations 322 or between a wireless mobile station 322 and a landline telephone user 332 via a public switched telephone network (PSTN) 334. The function of the base station 326 is commonly to handle the radio communications between the cell 324 and the wireless mobile terminal 322. In this capacity, the base station 326 functions chiefly as a relay station for data and voice signals.

As illustrated in FIG. 3B, in a celestial communication system, a satellite 342 may be employed to perform similar functions to those performed by a conventional terrestrial base station, for example, to serve areas in which population is sparsely distributed or which have rugged topography that tends to make conventional landline telephone or terrestrial cellular telephone infrastructure technically or economically impractical. A satellite radiotelephone system 340 typically includes one or more satellites 342 that serve as relays or transponders between one or more earth stations 344 and terminals 323. The satellite conveys radiotelephone communications over duplex links 346 to terminals 323 and an earth station 344. The earth station 344 may in turn be connected to the PSTN 334, allowing communications between satellite radiotelephones, and communications between satellite radio telephones and conventional terrestrial cellular radiotelephones or landline telephones. The satellite radiotelephone system 40 may utilize a single antenna beam covering the entire area served by the system, or, as shown, the satellite may be designed such that it produces multiple minimally-overlapping beams 348, each serving distinct geographical coverage areas 50 in the system's service region. The coverage areas 350 serve a similar function to the cells 324 of the terrestrial cellular system 320 of FIG. 3A.

Such terrestrial or satellite communication systems may also be used for location determination. For example, the cell 324 in which the device resides may be determined. Similarly, triangulation between base stations 326 may also be accomplished, for example, based on the relative signal strength and/or signal delays associated with different base stations 326.

For more localized communications wireless networking devices, such as an IEEE 802.11 wireless network adapter may be provided. Such wireless network communications may be carried out as if the monitoring device were connected directly to a network, such as an Internet Protocol (IP) network. Location determination in such a wireless network could also be determined, for example, by determining the wireless access point utilized by the device. Each wireless access point could then be associated with a geographic range of the wireless communications to the wireless access point to determine the location of the monitoring device.

Figure 3C:
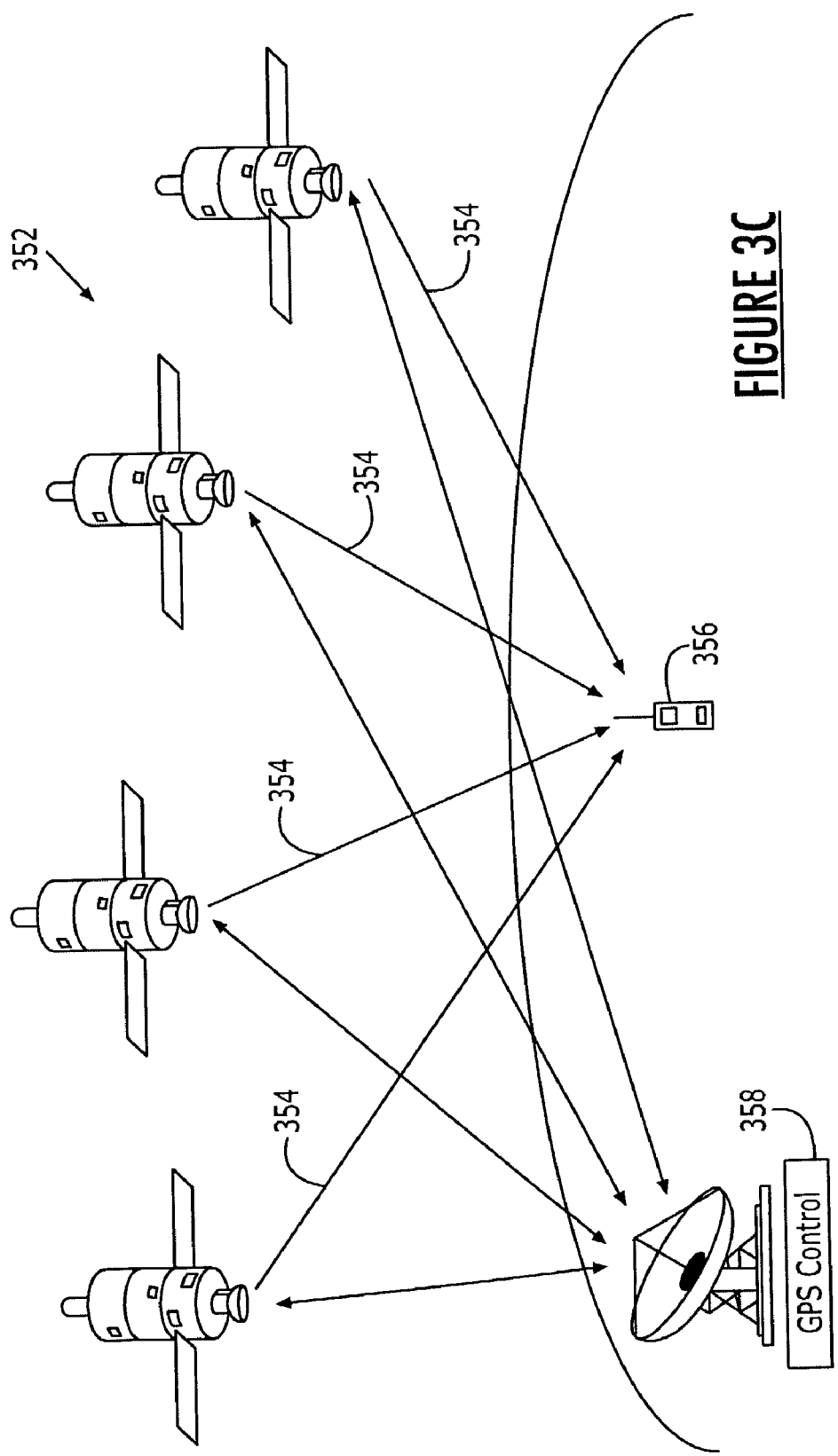
FIG. 3C is a schematic illustration of a conventional global positioning system.

Embodiments of the present invention may also incorporate a global positioning system for use as the position determination device. Briefly, as illustrated in FIG. 3C, GPS is a space-based triangulation system using satellites 352 and computers 358 to measure positions anywhere on the earth. GPS was first developed by the United States Department of Defense as a navigational system. The advantages of this navigational system over other land-based systems are that it is not limited in its coverage, it provides continuous 24-hour coverage, regardless of weather conditions, and is highly accurate. While the GPS technology that provides the greatest level of accuracy has been retained by the government for military use, a less accurate service has been made available for civilian use. In operation, a constellation of 24 satellites 352 orbiting the earth continually emit a GPS radio signal 354. A GPS receiver 356, e.g., a radio receiver with a GPS processor, receives the radio signals from the closest satellites and measures the time that the radio signal takes to travel from the GPS satellites to the GPS receiver antenna. By multiplying the travel time by the speed of light, the GPS receiver can calculate a range for each satellite in view. Ephemeris information provided in the satellite radio signal typically describes the satellite's orbit and velocity, thereby generally enabling the GPS processor to calculate the position of the GPS receiver 356 through a process of triangulation.

The startup of a GPS receiver typically requires the acquisition of a set of navigational parameters from the navigational data signals of four or more GPS satellites. This process of initializing a GPS receiver may often take several minutes.

The duration of the GPS positioning process is directly dependent upon how much information a GPS receiver has initially. Most GPS receivers are programmed with almanac data, which coarsely describes the expected satellite positions for up to one year ahead. However, if the GPS receiver does not have some knowledge of its own approximate location, then the GPS receiver cannot find or acquire signals from the visible satellites quickly enough, and, therefore, cannot calculate its position quickly. Furthermore, it should be noted that a higher signal strength is needed for capturing the C/A Code and the navigation data at start-up than is needed for continued monitoring of an already-acquired signal. It should also be noted that the process of monitoring the GPS signal is significantly affected by environmental factors. Thus, a GPS signal which may be easily acquired in the open typically becomes harder to acquire when a receiver is under foliage, in a vehicle, or worst of all, in a building.

As described in U.S. Pat. No. 6,295,023, the disclosure of which is incorporated herein by reference as if set forth fully herein, GPS and cellular communications techniques may be combined to facilitate rapid location determination. Such a combined technique may be beneficial so as to reduce power consumption by reducing the duration that a monitoring system needs to be powered to determine and provide location information.

As will be appreciated by those of skill in the art, the particular communication device and/or position determination device utilized may depend on the use of the monitoring device. For example, if the device is utilized in a relatively small predefined geographic area, then a wireless network may be utilized for both communications and positions. However, if the device is to be used or transported over a large geographic area, then a cellular or satellite communication system may be used in combination with a GPS for position determination. Thus, the present invention should not be construed as limited to a particular communication device and/or positioning system.

Furthermore, because the use of the monitoring device may change, the communications system and/or positioning system may be provided in a modular form such that differing communications and/or positioning systems may be interchanged.

Referring now to FIGS. 4 and 5, in certain embodiments, the system 5 may be configured to define segmented regions or virtual geographical fences 75p to alert when a device travels outside its planned use district or region 75r and/or transport corridor 75c. FIG. 4 illustrates two examples of segmented regions. The first perimeter of a geographical fence 75p is illustrated in the exemplary map as defined along the west coast of the United States. That is, for equipment owned by the California DOT ("department of transportation"), coordinates may be defined that indicate when a gauge 10 or other hazmat material is moved outside its intended use region 75r. Smaller segments within a district or larger or non-contiguous use regions can also be defined as the geographical virtual fence regions (not shown). The virtual geographical fences 75p can be adjusted according to planned use schedules upon an authorized request to the remote station 20 by a user or allocation facility.

FIG. 4 also illustrates that the fence 75p can be set up to enclose a predefined shipping corridor 75c for moving or transporting a device from point A to point B. In addition, the fence 75p associated with the cumulative shipping corridor 75c may be segmented and serially adjusted or advanced based on the transport rate, speed, and/or the pendency time expected in each of several adjacent regions to even more closely monitor when such the device fails to advance into the next territory of the expected region at the projected time (which may be particularly suitable for long-distance hauls).

FIG. 5 illustrates a similar concept to that shown in FIG. 4. In this embodiment, the United States may be divided into a grid of pre-defined and/or adjustable fences 75p such as with several adjacent or overlapping use regions and associated restricted virtual fences 75p. Similarly, on a global perspective, each or selected countries may be set-up to indicate when devices are leaving or entering their borders (shown by the horizontal arrow positioned over Spain), or a border of particular interest. The grid of virtual geographical fences may be set-up to extend over waterways and airways and the like.

While embodiments of the present invention have been described with reference to virtual fences covering relatively large geographic regions, such virtual fences could also be utilized for a particular path of transit or location of a device. With the availability of detailed maps of highway systems integrated with GPS devices, the particular path of travel of a device could be used as a starting point and boundaries defined around that path of travel that are relatively small such that a deviation from a projected path of travel beyond expected normal deviation could trigger an alert. Thus, the virtual fences according to embodiments of the present invention may vary in geographic scope based on the information available about the use or transport of the devices.

Figure 6:
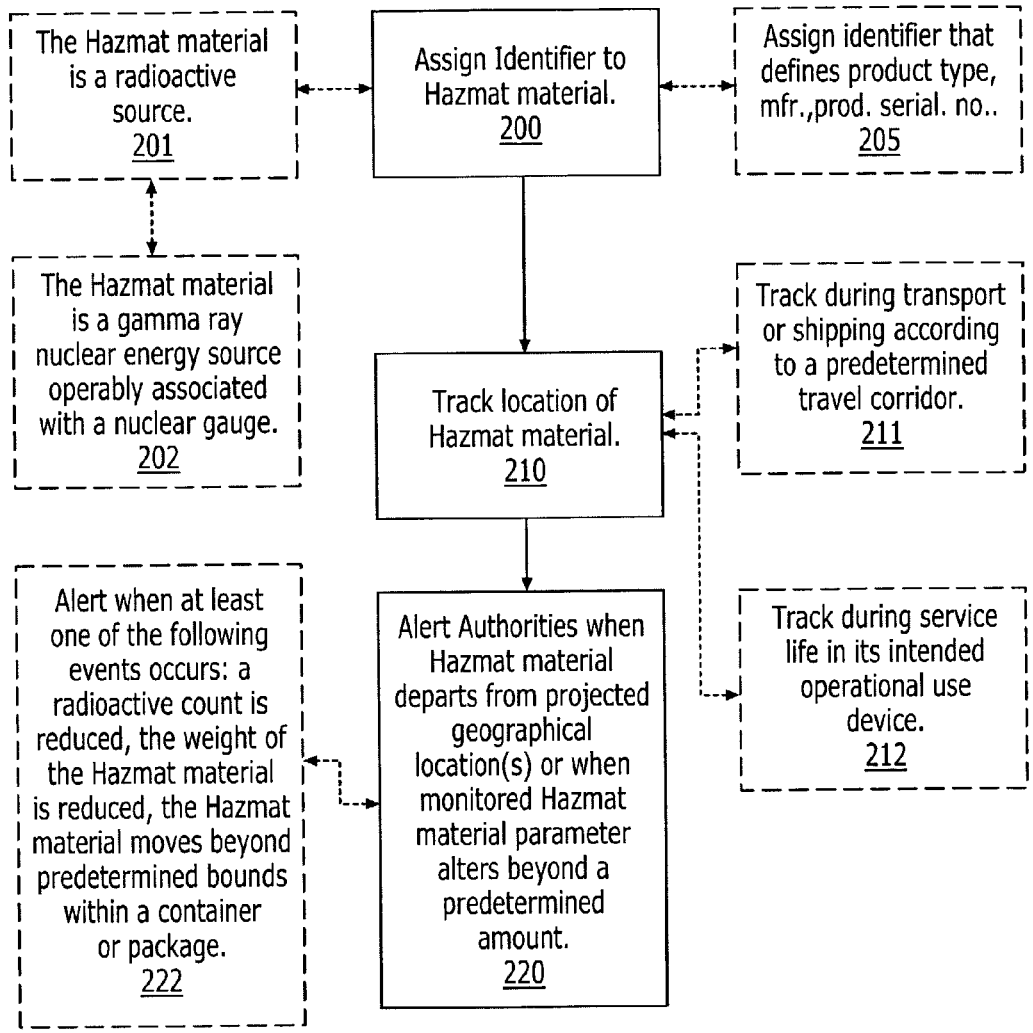
FIG. 6 is a block diagram of operations that can be used to carry out embodiments of the present invention.

FIG. 6 illustrates examples of operations that can be used to carry out embodiments of the present invention. An identifier can be assigned to a container of hazmat material (block 200). The identifier can, for example, be an alphanumeric indicia that represents a product type, type of hazardous material, manufacturer, product serial number, owner, shipping date, first field use or arrival date, and the like (block 205). The hazmat material can comprise a radioactive source (block 201). The hazmat material can include a radioactive material such as a gamma ray energy source operably associated with a nuclear gauge (block 202). The location of the hazmat material is tracked at desired intervals (block 210). The location can be tracked during shipping or transport to monitor whether it stays within a predetermined travel corridor (block 211). The location of the hazmat can be tracked during its normal intended service life in its intended operational use or storage container or device (block 212). Authorities are automatically alerted with hazmat material departs from a projected geographical location or region and/or when a monitored parameter of the hazmat material departs from a predetermined amount (block 220). The alert can be generated when at least one of the following events is detected: a radioactive count is reduced from a predetermined amount; the weight of the hazmat material is reduced from the original quantity; the hazmat material moves beyond a predetermined boundary or a distance within the housing, container or package (block 222).

FIGS. 7A and 7B show an exemplary embodiment of a tracking device 14 integrated into the housing 10h of a nuclear measurement gauge 10. As shown, the nuclear gauge 10 includes two radioactive sources 11, a gamma source 11g and a neutron source 11n. Each source 11 can include its own Geiger Mueller counter (not shown) as is conventional with this type of nuclear gauge 10. The tracking device 14 can comprise an antenna 14a and electronic circuitry 14c that interfaces with the operational control system of the device 10. The antenna 14a can be of any suitable type sufficient to transmit and/or relay the tracking signal and configured to meet regulatory operational requirements. The antenna 14a can be a retractable antenna, a stationary antenna, a flat antenna, a coil antenna, an antenna that is formed directly into the interior of the gauge housing or into the surface of the housing and the like (not shown).

The tracking device 14 can include computer program code and circuitry 14c that allows remote activation/deactivation or adjustment of certain operational parameters of the device 10 and/or tracking system 14 as well as transfer of desired data in substantially real-time using the remote communication system 14w. For example, the device 10 can be configured to relay measurement or test data at the time it is taken to a desired remote site. This feature can allow inspection personnel with real time access to results and an associated precise location as to where the data was collected. The transfer of data can be made so that it is compatible with standard database programs. In addition or alternatively, the remote control interface can be used to place the tracking device 14 and/or nuclear gauge 10 in a "sleep mode" to preserve battery power during non-operative periods. The remote interface may also be used to deactivate, disable or functionally destroy the gauge 10 in the case of detected misuse by an operator. Other operational parameters of the nuclear gauge may also be controlled or obtained via the remote interface as desired (such as to obtain diagnostics or trouble shoot problems and the like).

The tracking device 14 can be configured to disable the operation of the device 10 if there is an attempt to remove the radioactive source 11 from the device 10. The tracking device 14 can be configured with one or more anti-theft sensors (shown schematically as element 141s in FIG. 10) that are in communication with the radioactive source(s) 11, whether held inside the housing 10h, outside the housing, or on a desired surface of the housing 10h. In certain embodiments, a plurality or redundant number of anti-theft sensors are concealed inside the housing at different, possibly random, locations from device to device, to inhibit easy removal or deactivation of the tracking system 14.

Similarly, "red-herring" components may be used as well as the real components so that a potential thief will have to overcome these obstacles before being able to disable or dislodge the true tracking circuitry 14c. The "red-herring" components can include an antenna and similar packing of the true components and be electrically connected to the tracking circuit 14c with a monitoring line so that if a person chooses to remove the false equipment before the "real" tracking circuitry, an immediate alert can be generated. The anti-theft tracking can be based on one or a plurality of different physical or operational parameters including, but not limited to: radioactive counts, weight, movement of the source(s) 11 within or from the device housing 10h, if a signal is obtained outside a defined fence segment 75p (such as beyond an intended or projected use region 75r or transport corridor 75c), or if no signal is obtained after a predetermined (successive) number of interrogations fails to obtain a communication tracking signal.

In other embodiments, the tracking device 14 can be configured to operate independently of the measurement device 10 itself. For example, the tracking device 14 can be configured as a self-contained system that can be positioned in or on the housing 10h of the device. As such, the tracking system 14 can include its own power source and electronic circuitry 14c that provides the wireless communication system 14w to allow tracking of the location of the device 10. In certain embodiments, the system 14 can also include one or more Geiger Mueller counters (separate from those for measurement operation of the device 10 itself), displacement, weight or movement sensors to detect when the radioactive source(s) 11 are being removed from the housing 10h and the like.

Figure 8B:
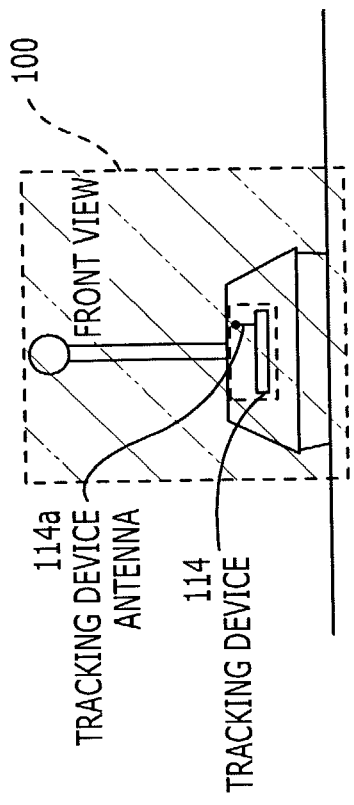
FIG. 8B is an end view of the device and container shown in FIG. 8A.
Figure 8A:
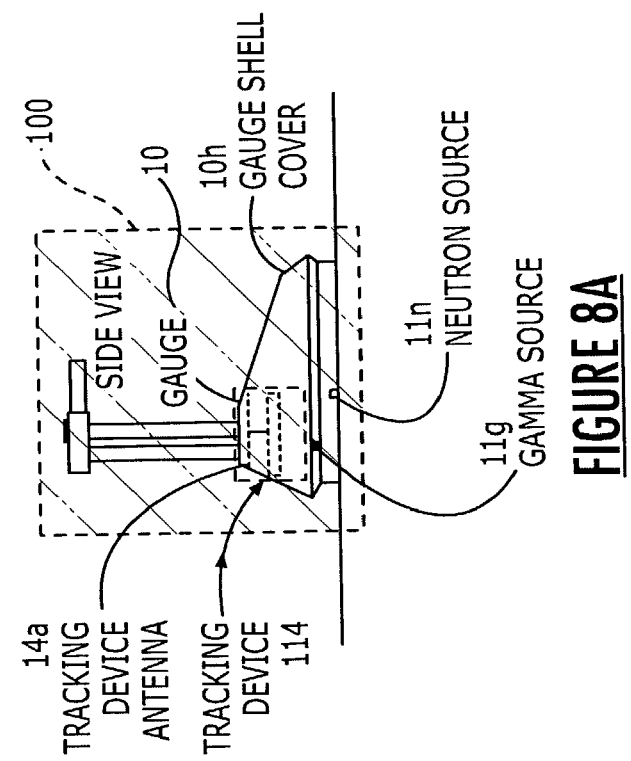
FIG. 8A is a side view of a nuclear measurement gauge in a shipping container with the tracking device disposed on or in the shipping container according to embodiments of the present invention.

FIGS. 8A and 8B illustrate the device 10 held inside a packaging or shipment container 100. In this embodiment, the tracking device 114 is held on or inside of the container 100. To inhibit external viewing of the location of the tracking device 114, the tracking device 114 can be held inside the container such as on an internal wall or inside packaging material in the container 100. Again, when inserting the device 114 into the container, different, possibly random, positioning may be desired from device 10 to device 10 or from container 100 to container 100. It may also be desirable to use two tracking devices 14, 114, one on the shipping container 100 and the other that remains with the device 10. The device on the container 114 may be reused for additional transports by returning it to a shipping site and reprogramming the system with a new serial number for tracking purposes.

Figure 9:
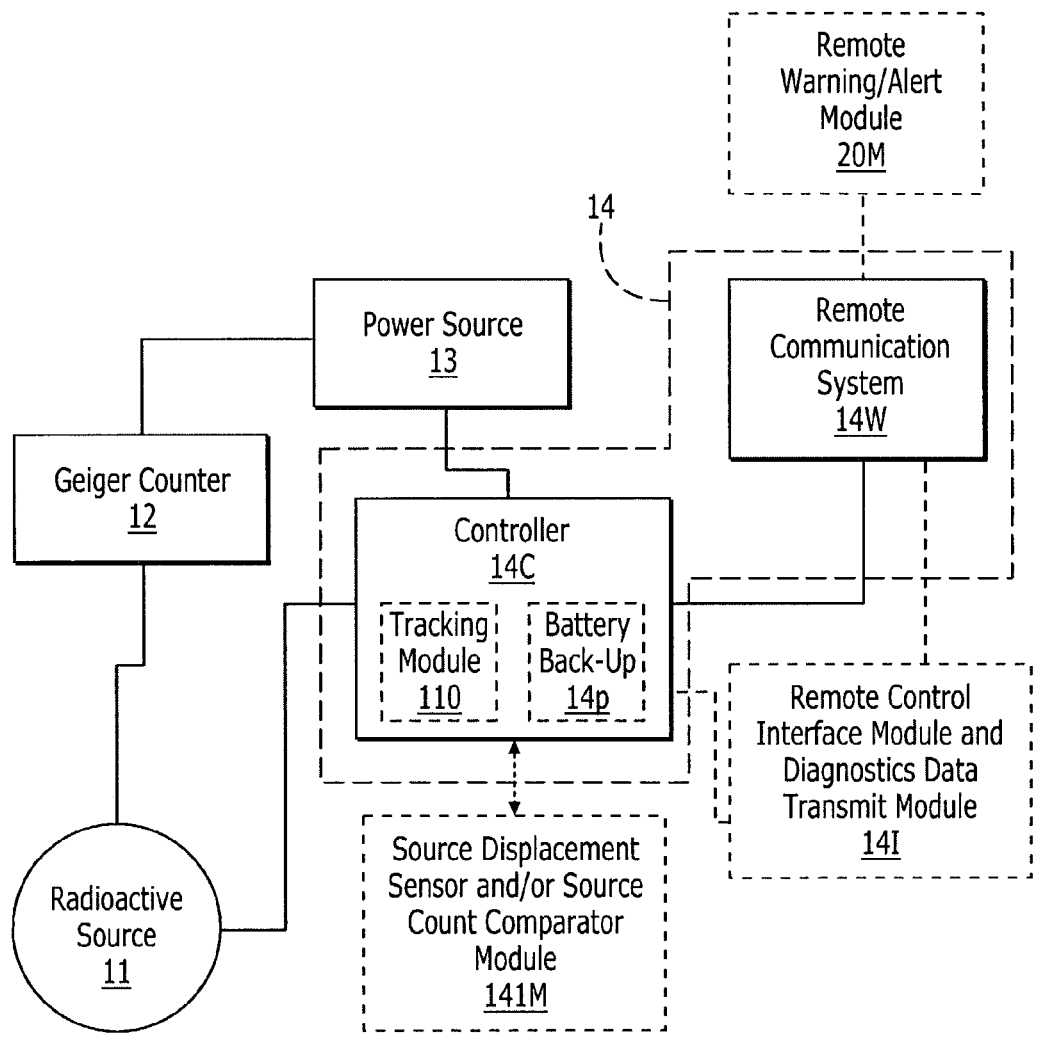
FIG. 9 is a schematic illustration of components of a nuclear gauge device having a radioactive source and tracking system according to embodiments of the present invention.

FIG. 9 illustrates one example of a nuclear gauge 10 with a tracking device 14. The tracking device 14 includes software and hardware components. As shown, the tracking device 14 includes the remote wireless communication system 14w and the tracking circuit 14c that includes a controller 110 with a tracking module 14m. The tracking device 14 may also include a battery back-up and/or primary power source 14p. The controller 110 can be a joint controller that is configured to control normal operation of the measurement device 10 as well as the tracking device 14 or may be a controller that is independent of the controller of the device 10 itself. If the tracking device 14 includes its own controller 110, then it may be configured to communicate with the device controller or act independently thereof.

The tracking device 14 may also optionally include one or more of a source count comparator module 141m, a remote control interface module 141, and a remote warning/alert module 20M. The source count comparator module 141m can actively or dynamically detect the number of counts in a monitoring period and compare it to predetermined threshold values that can confirm the radioactive source(s) 11 is still in the equipment 10. The active detection can be carried out concurrently or proximate in time to when the time the locational tracking interrogation is undertaken. Typically, the count detection can be carried out in a time period of less than one minute and typically in less than about 30 seconds to confirm that a suitable count is obtained (100–200 counts/min or 50–100 counts per 30 seconds). The data from the source count comparator module 141m can be transmitted to the remote station 20 with the locational data. The remote control interface module 141 can be configured to allow the remote station 20 to control certain operational parameters of the device 10 and/or the tracking device 14. The remote warning/alert module 20M can be located in the local device 10 and/or at the remote station 20 (FIG. 1), to automatically generate an alert, such as an audible local alert and a remote alert that can be electronically or telephonically relayed to regulatory or interested parties, upon the detection of predetermined conditions associated with the location of the device 10 (such as outside a predetermined use or shipping zone) or a detected tampering of the source 11 in the device 10 (such as when the count is decreased from a projected value).

Figure 10:
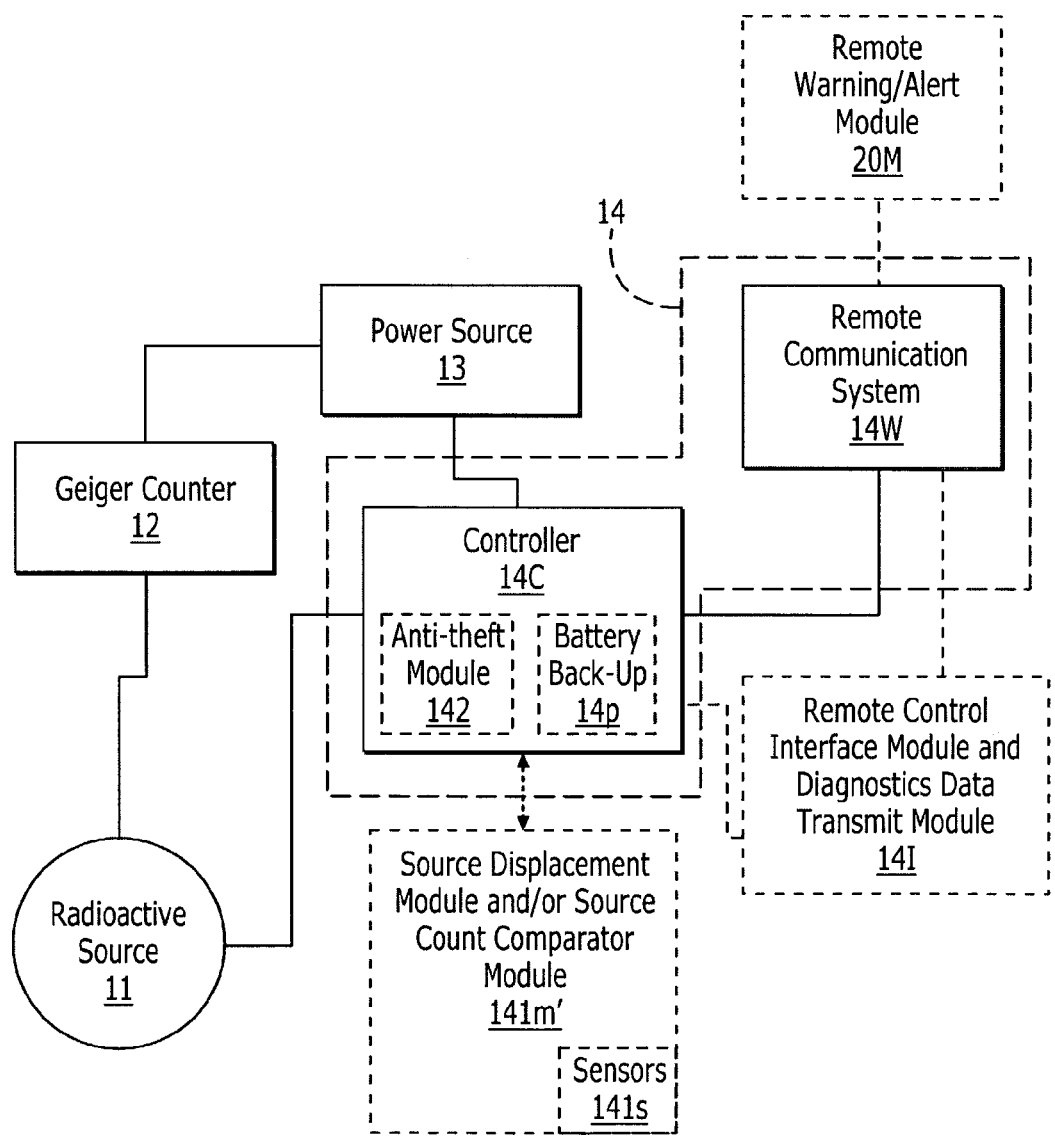
FIG. 10 is a schematic illustration of an alternative configuration of a nuclear gauge device having a radioactive source and tracking system according to embodiments of the present invention.

FIG. 10 illustrates a nuclear gauge 10 with a tracking device 14 similar to that shown in FIG. 9. FIG. 10 further illustrates that the source count module 141m can be alternatively configured to be a source displacement module and/or a source count module 141m'. FIG. 10 also illustrates that the controller 14c includes an anti-theft module 142 that disables the operation of the nuclear gauge 10 upon detection of predetermined conditions or parameters, typically using data from the source displacement and/or source count module 141m' to determine whether to activate the anti-theft module 142. The anti-theft module 142 can be configured to switch off the power source 13 or transmit a voltage or current sufficient to destroy a circuit in the controller or other circuitry in the device 10. The anti-theft module 142 can be configured to initiate the remote warning/alert module, to automatically generate an alert, such as an audible local alert and a remote alert that can be electronically or telephonically relayed to regulatory or interested parties, upon the detection of predetermined conditions associated with the location of the device 10 (such as outside a predetermined use or shipping zone) as noted above and/or upon one or more sensor based detection that the source 11 has been moved beyond certain predetermined boundaries in the device 10 or from the perimeter bounds of the device 10 or when the count is decreased from a projected value.

For cellular telephone based tracking devices, the "on-board" tracking device 14 can be configured as a relatively miniaturized palm or pocket-sized device (with a circuit board being less on the order or less than about 4 inches×2 inches×1.2 inches) with a relatively low weight (less than about 6 ounces, typically about 3 ounces). The tracking device 14 can be configured to have a power requirement of between about 6–13.6 volts with a current draw of about 250 mA nominal with a current draw during transmit/receive of about 2 A maximum. The output can be configured as NMEA and the GPS receiver can be a 12-channel receiver. The locational accuracy is expected to be accurate to less than about 4 meters.

For satellite based tracking devices, the "on-board" tracking device 14 can be configured to operate with an up-link frequency between about 148.000–150.050 MHz and a down-link frequency of between about 137.000–138.000 MHz. The transmit current can be on the order of about 2.5 A and the receive current at about 90 mA. The GPS receiver may have about 8 channels. Again the device may be relatively miniaturized with a circuit board that may be configured as about 5.9×3.5×1.3 inches. In other embodiments, the "on-board" tracking device 14 can comprise circuitry that combines the cell based and satellite technologies or other desired tracking technology.

In particular embodiments, the tracking device can be configured to generate a remotely trackable beacon signal rather than allow interface or communications between the tracking device and/or the measurement or nuclear device 10 itself. It is contemplated that the tracking device may be mounted on or in the radioactive source itself to inhibit removal from the surface or container device and allow more precise tracking of the hazmat material apart from its intended use device.

As will be appreciated by one of skill in the art, the present invention may be embodied as an apparatus, a method, data or signal processing system, or computer program product. Accordingly, the present invention may take the form of an entirely software embodiment, or an embodiment combining software and hardware aspects. Furthermore, certain embodiments of the present invention may take the form of a computer program product on a computer-usable storage medium having computer-usable program code means embodied in the medium. Any suitable computer-readable medium may be utilized including hard disks, CD-ROMs, optical storage devices, or magnetic storage devices.

The computer-usable or computer-readable medium may be, but is not limited to, an electronic, magnetic, optical, electromagnetic, infrared, or semiconductor system, apparatus, device, or propagation medium. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted or otherwise processed in a suitable manner if necessary, and then stored in a computer memory.

Computer program code for carrying out operations of the present invention may be written in an object oriented programming language such as Java®, Smalltalk, Python, Labview, C++, or VisualBasic. However, the computer program code for carrying out operations of the present invention may also be written in conventional procedural programming languages, such as the "C" programming language or even assembly language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The flowcharts and block diagrams of certain of the figures herein illustrate the architecture, functionality, and operation of possible implementations of analysis models and evaluation systems and/or programs according to the present invention. In this regard, each block in the flow charts or block diagrams represents a module, segment, operation, or portion of code, which comprises one or more executable instructions for implementing the specified logical function(s). It should also be noted that in some alternative implementations, the functions noted in the blocks may occur out of the order noted in the figures. For example, two blocks shown in succession may in fact be executed substantially concurrently or the blocks may sometimes be executed in the reverse order, depending upon the functionality involved.

Figure 11A:
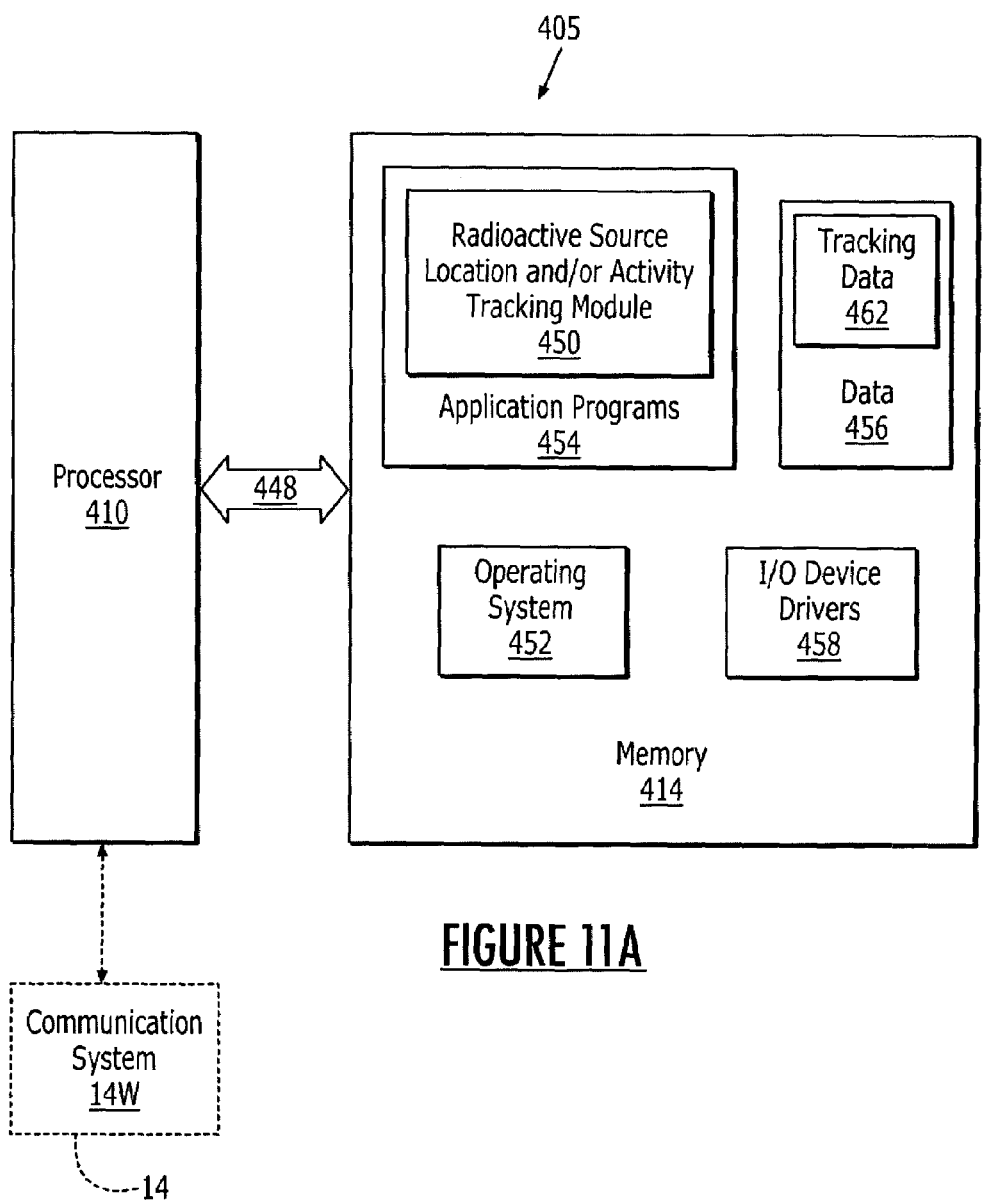
FIG. 11A is a block diagram of a data processing system suitable for incorporation into a nuclear measurement device according to embodiments of the present invention.
Figure 11B:
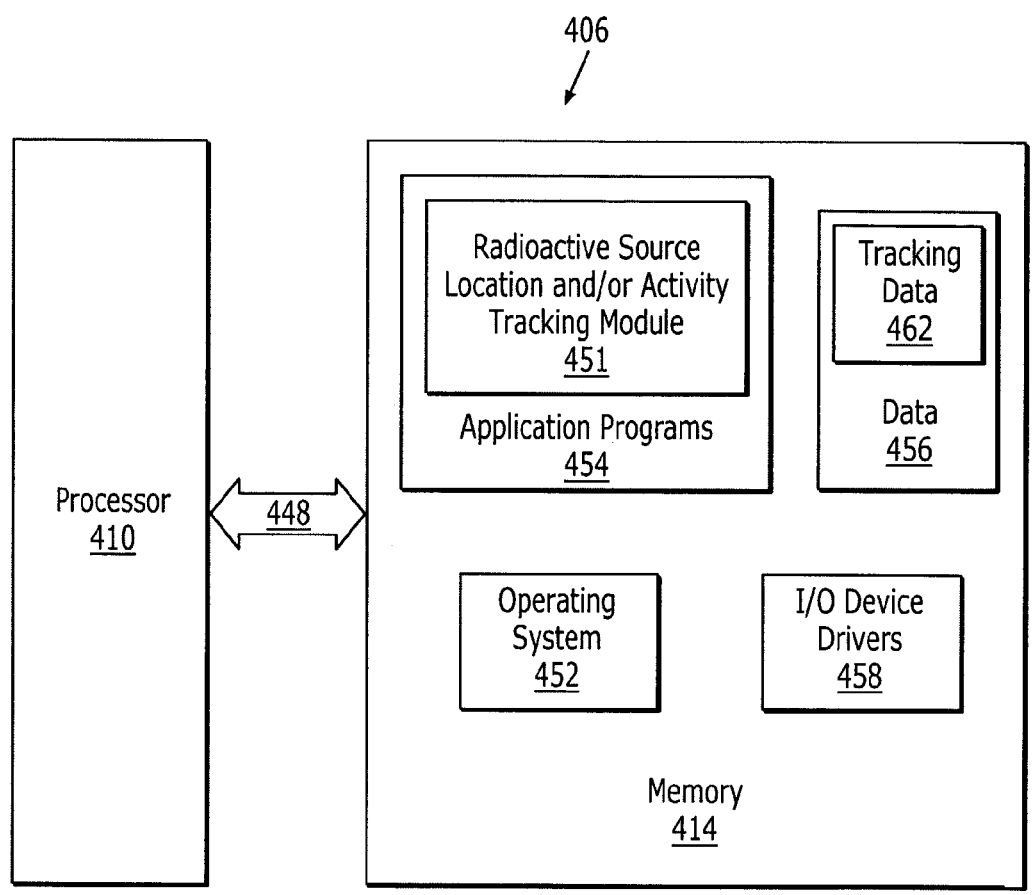
FIG. 11B is a block diagram of a data processing system suitable for use as a tracking station according to embodiments of the present invention.

FIGS. 11A and 11B are block diagrams of exemplary embodiments of data processing systems that illustrates systems, methods, and computer program products in accordance with embodiments of the present invention. In general, the data processing system of FIG. 11A may be incorporated in the nuclear gage 10 and the data processing system of FIG. 11B utilized as the tracking station 20. For example, the data processing system may provide some or all of the functionality of the controller 14C, the remote control interface 141, the remote warning module 20M and/or the source count comparator module 141*m* of FIGS. 9 and 10. Similarly, the data processing system may also provide some or all of the functionality of the anti-theft module 142 and/or the source displacement module 141*m'* of FIG. 10. Thus, the data processing systems may be configured to operate in conjunction with additional circuitry, such as communications devices, location tracking devices, sensors, switches or the like so as to locally and/or remotely monitor and/or control a nuclear gauge 10.

As seen in FIGS. 11A and 11B, the processor 410 communicates with the memory 414 via an address/data bus 448. The processor 410 can be any commercially available or custom microprocessor. The memory 414 is representative of the overall hierarchy of memory devices containing the software and data used to implement the functionality of the data processing system. The memory 414 can include, but is not limited to, the following types of devices: cache, ROM, PROM, EPROM, EEPROM, flash memory, SRAM, and DRAM.

As shown in FIGS. 11A and 11B, the memory 414 may include several categories of software and data used in the data processing system: the operating system 452; the application programs 454; the input/output (I/O) device drivers 458; a radioactive source location and/or activity tracking module 450 or 451; and the data 456. The tracking module 450 incorporated in the nuclear gauge 10 can include a dynamic comparator module to affirm that the radioactive source is still intact in the device. The tracking module 450 can be configured to track other hazardous materials as discussed above.

In certain embodiments of the present invention where the data processing system is incorporated in the nuclear gauge 10, the tracking module 450 may carry out operations as described herein for monitoring, controlling and/or tracking the nuclear gauge 10. For example, the tracking module 450 can be configured to employ wireless mobile communication technology and/or GPS technology that defines the location of nuclear gauges being tracked over time. The tracking module 450 can be configured to relay its data to registered users or to the tracking station 20 that may allow registered users to access the tracking station 20 as a portal to obtain information about its equipment at any desired time, substantially continuous access 24-7. The tracking module 450 may also allow direct connection to the nuclear gauge 10, for example, by web enabling the data processing system that allows connection with the Internet or an intranet or by direct modem connection or the like to allow dynamic or periodic summary records of inventory and/or location of tracked devices or materials as desired. The tracking intervals can be programmably adjusted as well as any predetermined fences 75p that are established upon initiation of the tracking service.

In certain embodiments of the present invention where the data processing system (405 FIG. 11A, 406 FIG. 11B) is provided as the tracking station 20, the tracking module 451 may carry out operations as described herein for monitoring, controlling and/or tracking the nuclear gauge 10. Additionally, the tracking module 451 may also provide administrative functionality, such as transferring measurement data in conjunction with measurement location (GPS) to a central office, or providing summary reports, updates of software in the nuclear gauges, obtaining calibration data of the operational status of the device, or other such maintenance/administrative functions. For example, the tracking module 451 can be configured to employ wireless mobile communication technology to communication with a plurality of nuclear gauges 10 to track their locations, monitor their usage/status and/or control their operation. The tracking module 451 can be configured to relay its data to registered users or allow registered users to access the tracking station 20 as a portal to obtain information about the nuclear gauges 10 that are monitored, controlled and/or tracked at any desired time, for example, substantially continuous access 24 hours a day, 7 days a week. The tracking module 451 may also allow direct connection to particular ones of the nuclear gauges 10, for example, by web enabling the data processing system that allows connection with the Internet or an intranet or by direct modem connection or the like. The tracking module 451 may also maintain historical infonnation about the use and/or location of tracked nuclear gauges 10 that may be provided to a user and/or may allow real time access tracked nuclear gauges 10. Additionally, periodically summary records of inventory and/or location of tracked devices or materials as desired may also be provided. The tracking module 451 may also provide automated alerts to users when a predefined condition of a nuclear gauge or gauges 10 is detected. The tracking intervals can be programmably adjusted as well as any predetermined fences 75p may be established upon initiation of the tracking service and/or updated through the tracking module 451.

The data 456 may include tracking data 462 which may include operational and/or location tracking information. As will be appreciated by those of skill in the art, the operating system 452 may be any operating system suitable for use with a data processing system, such as OS/2, AIX or OS/390 from International Business Machines Corporation, Armonk, N.Y., WindowsCE, WindowsNT, Windows95, Windows98, Windows2000, WindowsXP or Windows XT from Microsoft Corporation, Redmond, Wash., PalmOS from Palm, Inc., MacOS from Apple Computer, UNIX, FreeBSD, or Linux, proprietary operating systems or dedicated operating systems, for example, for embedded data processing systems.

The I/O device drivers 458 typically include software routines accessed through the operating system 452 by the application programs 454 to communicate with devices such as I/O data port(s), data storage 456 and certain memory 414 components and/or the image acquisition system 420. The application programs 454 are illustrative of the programs that implement the various features of the data processing system and preferably include at least one application that supports operations according to embodiments of the present invention. Finally, the data 456 represents the static and dynamic data used by the application programs 454, the operating system 452, the I/O device drivers 458, and other software programs that may reside in the memory 414.

While the present invention is illustrated, for example, with reference to the tracking module 450 or 451 being an application program in FIGS. 11A and 11B as will be appreciated by those of skill in the art, other configurations may also be utilized while still benefiting from the teachings of the present invention. For example, the module 450 or 451 may also be incorporated into the operating system 452, the I/O device drivers 458 or other such logical division of the data processing system. Thus, the present invention should not be construed as limited to the configuration of FIGS. 11A and 11B, which is intended to encompass any configuration capable of carrying out the operations described herein.

In certain embodiments, the module 450 and/or 451 includes computer program code for defining geographic virtual fences for each of the tracked devices or for selected devices and comparing the location of the device(s) relative to the defined fences. The tracking module 450 and/or 451 may then automatically generate a warning or alert when the device departs from the respective region associated with its geographic virtual fence. The tracking module 450 and/or 451 physical data obtained dynamically during the locational monitoring to compare the physical data to predetermined data to confirm that the hazardous material and/or radioactive source is still in the device or container.

While the present invention is illustrated, for example, with reference to particular divisions of programs, functions and memories, the present invention should not be construed as limited to such logical divisions. Thus, the present invention should not be construed as limited to the configurations shown in the figures but is intended to encompass any configuration capable of carrying out the operations described herein.

Figure 12:
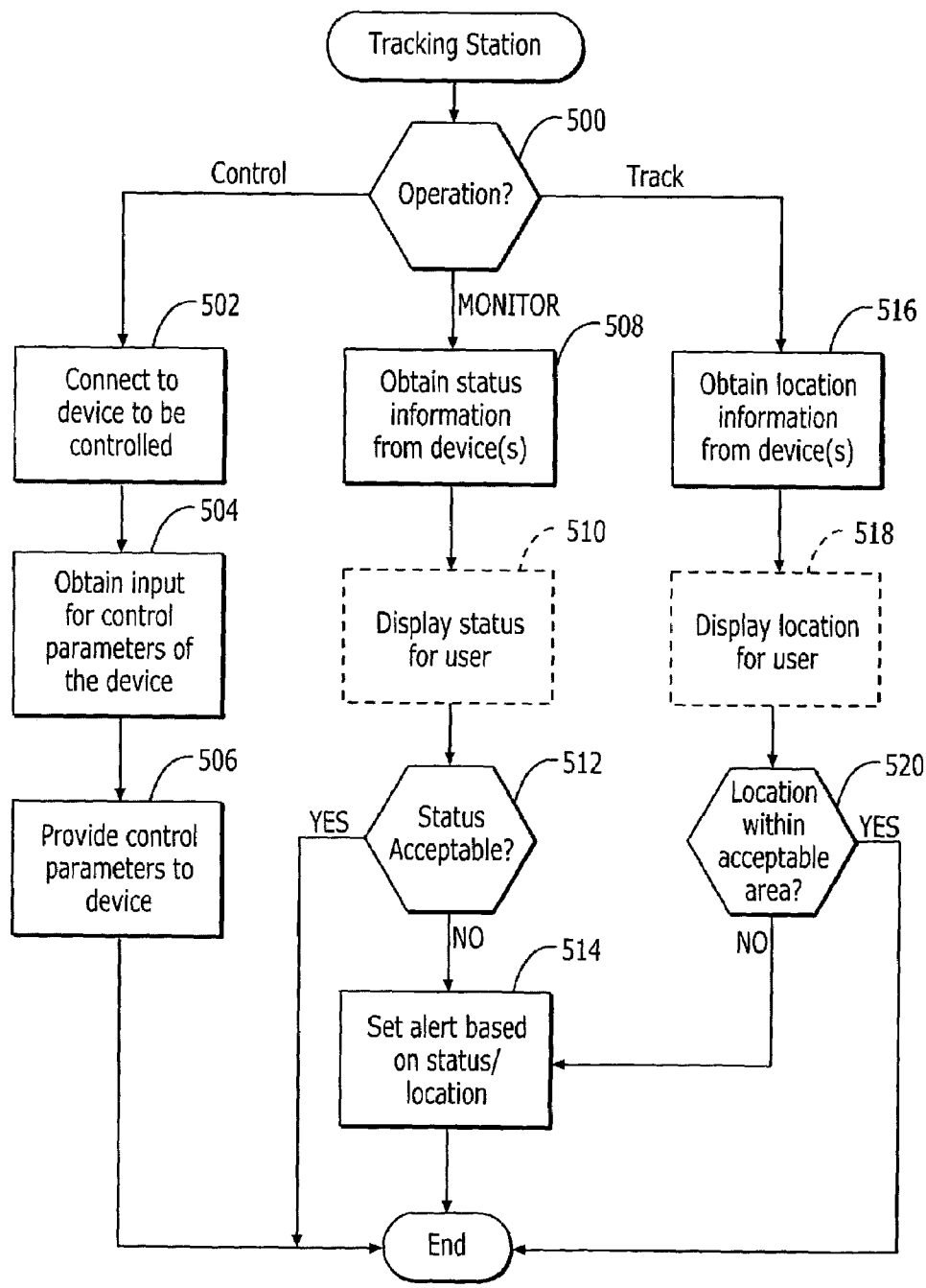
FIG. 12 is a flowchart illustrating operations of a tracking station according to embodiments of the present invention.

FIG. 12 illustrates operations of a tracking station 20 according to certain embodiments of the present invention. Operations illustrated in FIG. 12 are for the monitoring, controlling and tracking location of a nuclear gauge, however, only portions of the operations of FIG. 12 need be carried out if only one or two of the functions of monitoring, controlling and/or tracking location are desired. Thus, a tracking station 20 according to embodiments of the present invention need not carry out all of the operations of FIG. 12.

As seen in FIG. 12, if the operation carried out by the tracking station 20 is to control the operation of a nuclear gauge (block 500), the tracking station 20 connects to the device to be controlled (block 502) and obtains input for parameters that control the device (block 504). These control parameters are provided to the device over the connection (block 506). The connection to the device may, for example, be made by a landline, cellular or satellite telephony connection, a wireless network connection or a wired connection. Furthermore, the control of the device and obtaining of parameters may be carried out by providing a web browser interface to a user such that, for example, a CGI form is filled out by a user and the data from the CGI form provided to the device. The web browser interface may be provided by an applet, a servlet, HTML, WML or other such markup language or other techniques known to those of skill in the art. The web browser interface may be provided by the tracking station 20 directly or may be provided from the device through the tracking station, for example, if the device has an imbedded web server, such as a pico-server. Thus, the tracking station 20 may function as a web server that provided access to a back end service (the device) or may function as a gateway or proxy allowing access to the device through the tracking station 20.

The control parameters provided to the device may also be automatically generated by the tracking station 20 based, for example, on status information obtained from the device or location information associated with the device. For example, parameters that disable the device may be provided to the device in the event that the location of the device is outside a desired range or if the status of the device indicates that the nuclear source has been tampered with.

Returning to FIG. 12, if the operation carried out by the tracking station 20 is to monitor the status of a nuclear gauge (block 500), the tracking station 20 obtains the status information from the device (block 508). Optionally, the obtained status is displayed to a user (block 510), for example, by incorporating the status into a display of the tracking station 20 or by sending a web page to a remote user that contains the status information. The status information may be obtained from the device by querying the device or it may be automatically provided by the device to the tracking station 20. For example, the tracking station could periodically poll devices that it was tasked to monitor and request status information from the polled devices. If the device did not respond to the poll that information could also be reflected in the status information. Alternatively or in addition, the monitored devices could periodically send status information to the tracking station 20. The status information could also reflect if a device failed to send its status information at the predefined time. The status information obtained from the device may also include, as discussed above, information about the hazardous material associated with the device, information about the performance of the device, such as measurements of the nuclear gauge, administrative information such as the status of operational parameters of the device, including for example, the time period between the device sending status information, the charge of a battery associated with the device, communication parameters or the like.

However the status is obtained, the status may be evaluated based on a predefined criteria to determine if the status is acceptable (block 512). For example, if the status is a radioactive count, the status may be compared to a count threshold to determine if the radioactive source has been removed from the monitored device. Similarly, if the status is a battery charge level, the level of charge of the battery could be evaluated to determine if the battery needs charging. If the status is not acceptable (block 512), an alert may be set based on the status information (block 514). The alert may include, for example, sending a status message to a user, such as highlighting the unacceptable status on a display or on a web page provided to the user. The status message could also be sent to a user as an e-mail or voice mail message, pager message, facsimile transmission or the like reflecting the unacceptable status. If the status is acceptable (block 512), the operations for setting an alert are bypassed.

If the operation carried out by the tracking station 20 is to track the location of a nuclear gauge (block 500), the tracking station 20 obtains the location information from the device (block 516). Optionally, the obtained location information is displayed to a user (block 518), for example, by incorporating the location information into a display of the tracking station 20 or by sending a web page to a remote user that contains the location information. The location information may be obtained from the device by querying the device or it may be automatically provided by the device to the tracking station 20. For example, the tracking station could periodically poll devices that it was tasked to monitor and request location information from the polled devices. If the device did not respond to the poll that information could also be reflected in the location information. Alternatively or in addition, the monitored devices could periodically send location information to the tracking station 20. The location information could also reflect if a device failed to send its location information at the predefined time or upon occurrence of a predefined event. Examples of predefined events may include movement of the device, the device exiting a restricted geographic region or other such location based events. The location information could be information that identified an absolute location or a relative location. For example, the location information may be provided as GPS coordinates of a device or, where a restricted geographic region is defined for a device, the location information could indicate the relative location of the device with respect to the geographic region (i.e., whether the device was inside or outside the restricted geographic region).

However the location information is obtained, the location information may be evaluated based on a predefined criteria to determine if the location information is acceptable (block 520). For example, the location information may be compared to acceptable locations for the device to determine if the device is in an authorized location. If the location information is not acceptable (block 520), an alert may be set based on the status information (block 514). The alert may include, for example, sending a message to a user, such as highlighting the unacceptable location information on a display or on a web page provided to the user. The message could also be sent to a user as an e-mail or voice mail message, pager message, facsimile transmission or the like reflecting the unacceptable location information. If the location information is acceptable (block 520), the operations for setting an alert are bypassed.

While the operations illustrated in FIG. 12 have been described as being carried out by the tracking station 20, such operations could also be directly carried out by individual devices or containers of devices, such as the nuclear gauges 10, for example, by the data processing system. Thus, for example, an individual device could monitor its own status and/or location and if unacceptable directly notify a user as discussed above with reference to block 508 through 520. Accordingly, the operations of FIG. 12 should not be construed as limited to a tracking station 20.

Figure 13:
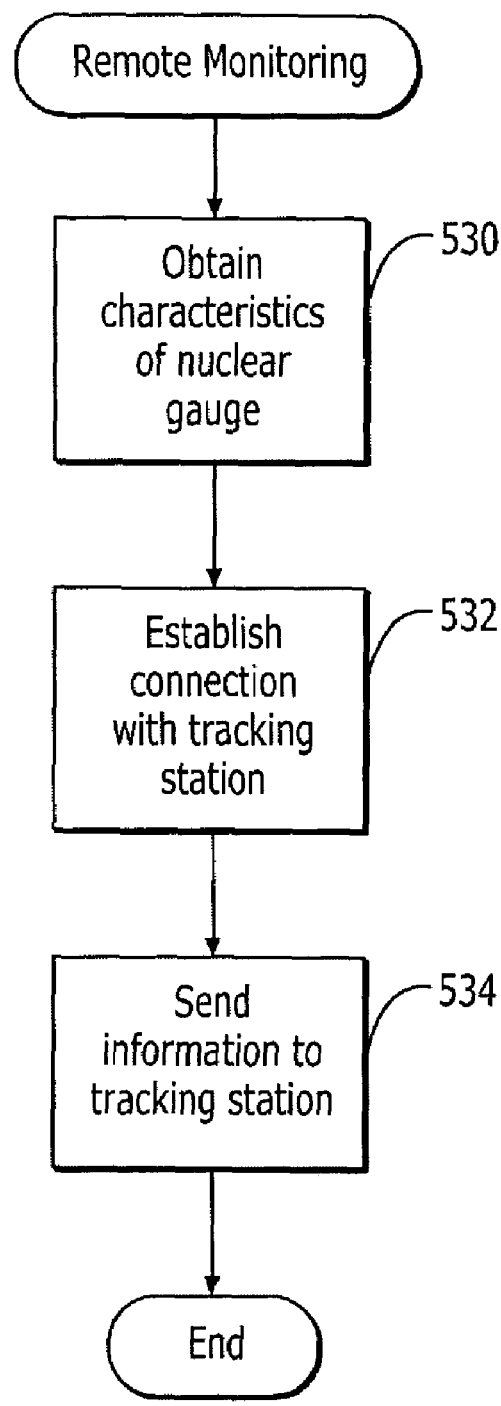
FIG. 13 is a flowchart illustrating operations of a nuclear measurement device incorporating embodiments of the present invention for remote monitoring.

FIG. 13 illustrates operations that may be carried out by a data processing system for remote monitoring of a nuclear gauge 10 according to certain embodiments of the present invention. As seen in FIG. 13, the data processing system obtains the characteristics of the nuclear gauge 10 to be provided as the status information (block 530). As discussed above, these characteristics may include, for example, characteristics associated with the radioactive source 11, operational characteristics of the nuclear gauge 10 and/or monitored results of operation of the gauge. A connection is established to the tracking station 20 (block 532) and the information sent to the tracking station over the connection. Alternatively, or in addition, the information could be sent directly to a user terminal that may act as a tracking station in this regard. As discussed above, the connection may be a wired, wireless, celestial or terrestrial telephony connection and/or a wired or wireless network connection. Furthermore, the information may be provided, for example, by sending the raw data, summary data, data fonnatted as, for example, a web page, or other such formats for transmitting information from one data processing system to another.

Figure 14:
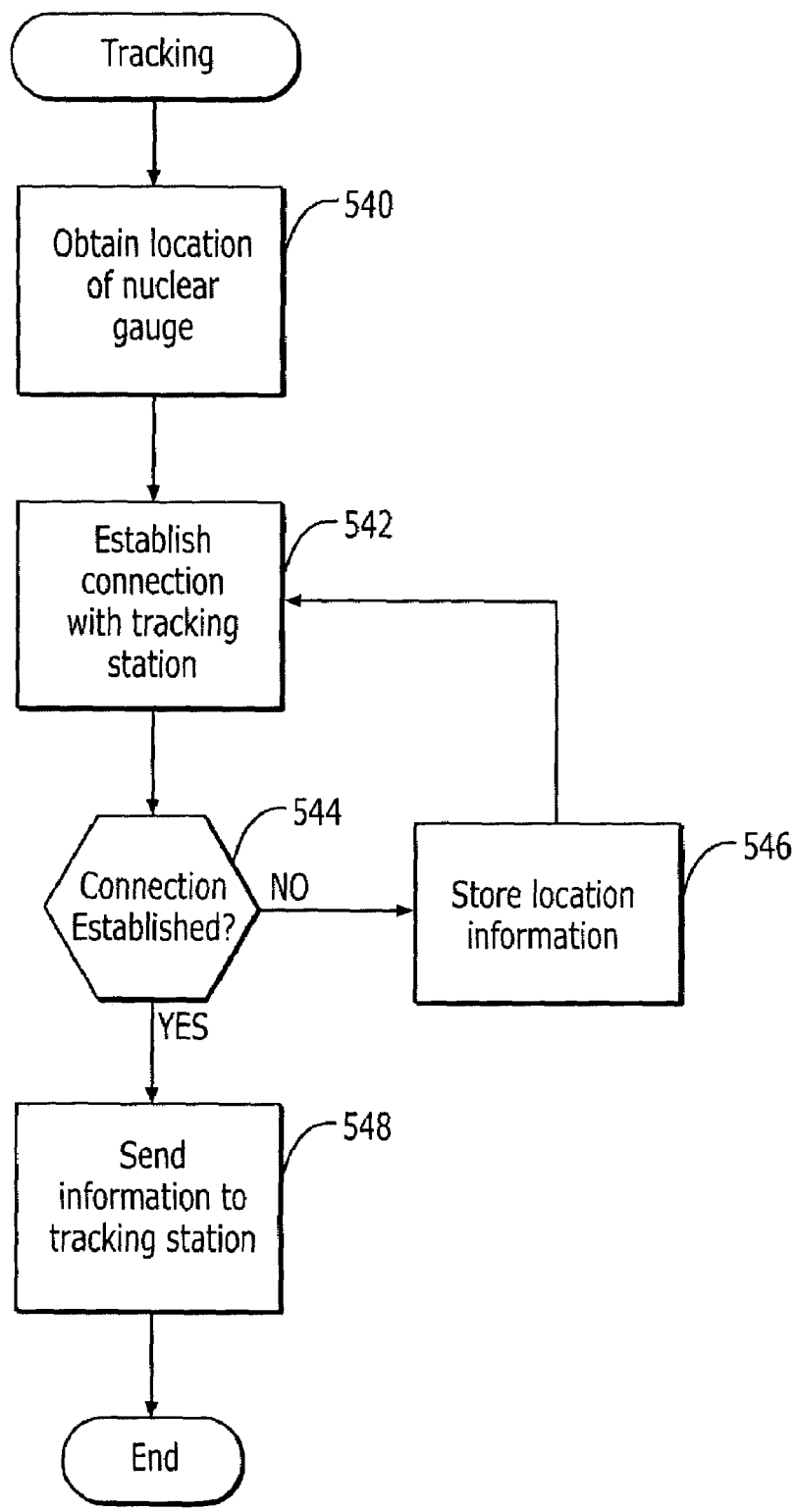
FIG. 14 is a flowchart illustrating operations of a nuclear measurement device incorporating to embodiments of the present invention for location tracking.

FIG. 14 illustrates operations of the data processing system (405, 406) for tracking the location of a nuclear gauge 10 according to certain embodiments of the present invention. As seen in FIG. 14, the data processing system obtains location information associated with the nuclear gauge (block 540), for example, through a GPS location determination. A connection is established to the tracking station (block 542) and the information is sent to the tracking station over the established connection (blocks 544 and 548). Alternatively, or in addition, the location information could be sent directly to a user terminal that may act as a tracking station in this regard. As discussed above, the connection may be a wired, wireless, celestial or terrestrial telephony connection and/or a wired or wireless network connection. Furthermore, the location information may be provided, for example, by sending the raw data, summary data, data formatted as, for example, a web page, or other such formats for transmitting information from one data processing system to another.

As is further illustrated in FIG. 14, optionally, if the data processing system is unable to establish a connection to the tracking system (block 544), the location information may be stored for subsequent transmission (block 546). In this manner, if the nuclear gauge 10 is transport outside the range of the communication system used the location history of the nuclear gauge 10 may be stored and sent to the tracking station 20 when the nuclear gauge re-enters the range of the communication system.

Figure 15:
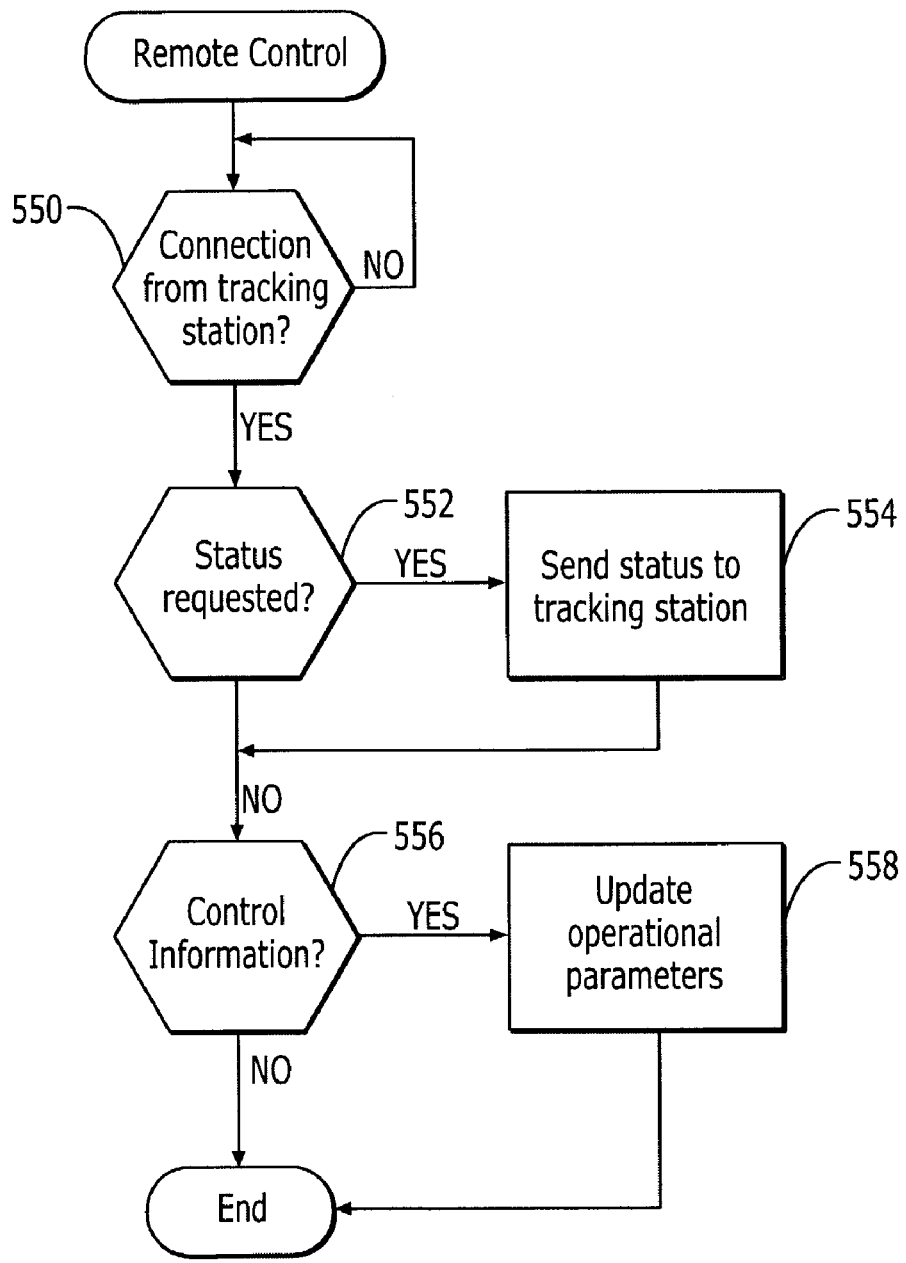
FIG. 15 is a flowchart illustrating operations of a nuclear measurement device incorporating embodiments of the present invention for remote control.

FIG. 15 illustrates operations of the data processing system for remote control of a nuclear gauge 10 according to certain embodiments of the present invention. As seen in FIG. 15, when a connection is established from the tracking station 20 (block 550), it is determined if the tracking station 20 is requesting status of the nuclear gauge 10 (block 552). If status is requested, the status is sent to the tracking station 20 (block 554). It is also determined if control information is provided by the tracking station 20 (block 556), and if so, the operational parameters of the nuclear gauge 10 are updated with the received control information (block 558). Such an update of operational parameters may include, for example, a verification of authority for such an update. Furthermore, the update may also include an update of the software of the nuclear gauge 10. Thus, the software may be updated remotely which may provide for updating multiple or remotely located nuclear gauges without having to physically visit each gauge. Operation of the nuclear gauge 10 would then be carried out utilizing the new operation parameters.

Figure 16:
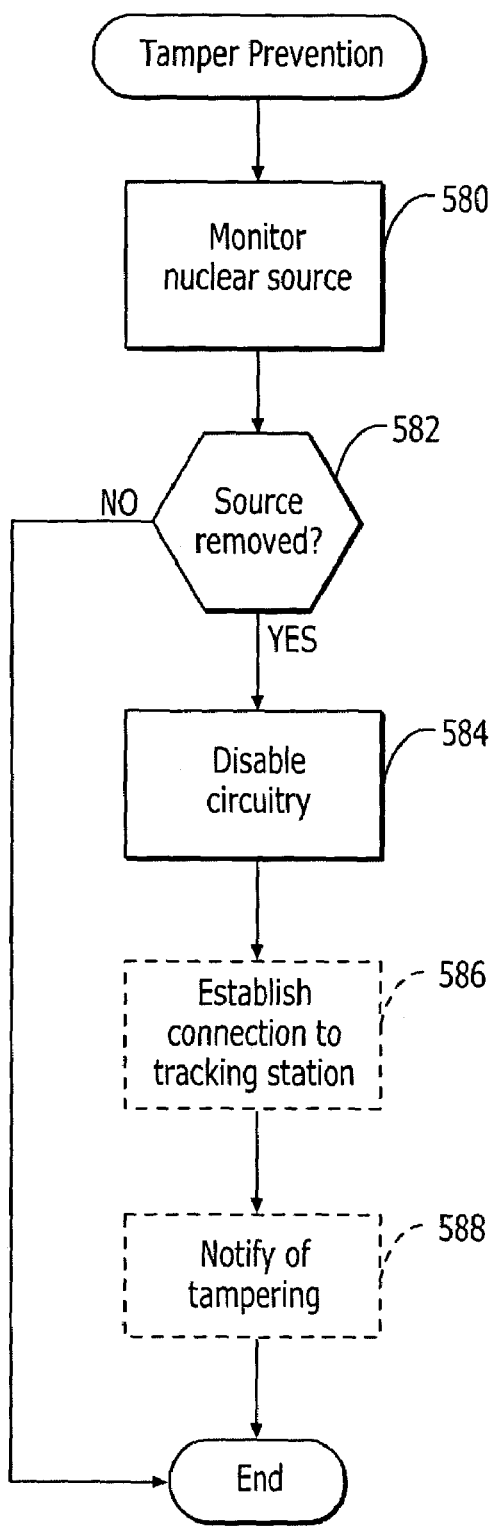
FIG. 16 is a flowchart illustrating operations of a nuclear measurement device incorporating embodiments of the present invention for tamper prevention.

Alternatively, or in addition, the connection may be established directly from a user terminal that may act as a tracking station in this regard. As discussed above, in either case, the connection may be a wired, wireless, celestial or terrestrial telephony connection and/or a wired or wireless network connection. FIG. 16 illustrates operations for tamper prevention of a nuclear gauge 10 according to certain embodiments of the present invention. As seen in FIG. 16, the nuclear source is monitored to determine if the source has been removed, moved or tampered with (block 580). If the source has been removed, moved inappropriately or tampered with (block 582), the circuitry of the nuclear gauge is disabled as described above (block 584). Optionally, a connection may be established to the tracking station 20 or user terminal (block 586) and the tracking station 20 notified of the tampering (block 588).

While embodiments of the present invention have been described above with reference to restricted areas where notification is provided if a device leaves the restricted area, embodiments of the invention also include restricted areas where notification is provided if the device enters the restricted area. In such embodiments, the virtual fences may be viewed as keeping device out of the area rather than keeping devices within the defined area.

The flowcharts, flow diagrams and block diagrams of FIGS. 9 through 16 illustrate the architecture, functionality, and operation of possible implementations of systems, methods and computer program products for processing of network initiated subsequent provisioning trigger requests according to embodiments of the present invention. In this regard, each block in the flow charts or block diagrams may represent a module, segment, or portion of code, which comprises one or more executable instructions for implementing the specified logical act(s). It should also be noted that, in some alternative implementations, the acts noted in the blocks may occur out of the order noted in the figures. For example, two blocks shown in succession may, in fact, be executed substantially concurrently, or the blocks may sometimes be executed in the reverse order, depending upon the functionality involved.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses, when used, are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A method for tracking the location of nuclear gauges comprising a radioactive component, comprising:

mounting a tracking device in proximity to a nuclear gauge having a radioactive component, the tracking device configured to provide at least one tracking signal that is detectable froma remote location to thereby allow its geographic location to be determined remotely;

obtaining the at least one tracking signal at a remote location and determining the geographic location of the nuclear gauge;

repeating the steps of obtaining and determining at successive desired monitoring intervals; and selectively adjusting the monitoring periods.

2. A method according to claim 1, wherein the obtaining step is carried out by transmitting the signal from a local site proximate to the nuclear gauge to a remote tracking station and wherein the determining step is carried out using one or both of wireless communication means and global positioning system means.

3. A method according to claim 2, further comprising repeating the steps of obtaining and determining at successive desired monitoring intervals.

4. A method according to claim 1, wherein the tracking device is operably associated with a sensor and/or detector that detects the presence of the radioactive component in the device over an operational service life of the nuclear gauge.

5. A method according to claim 4, further comprising:

detecting the number of counts associated with the radioactive source in the device; and comparing the detected count to a predetermined value to determine whether the radioactive source is intact in the device.

6. A method according to claim 5, further comprising relaying data associated with the detecting and comparing steps to the remote location.

7. A method according to claim 6, wherein the detecting and comparing steps are carried out proximate in time to the obtaining and determining steps to dynamically confirm the presence of the radioactive component in the device.

8. A method according to claim 6, further comprising detecting when the radioactive source has been removed from the nuclear gauge housing and generating an alert.

9. A method according to claim 1, wherein the nuclear gauge is a portable nuclear measurement gauge comprising a gamma source and a neutron source.

10. A method according to claim 9, wherein the portable nuclear measurement gauge is a moisture density gauge.

11. A method according to claim 1, further comprising generating historical summaries of the locations of the nuclear gauge over time.

12. A method according to claim 1, further comprising assigning a unique identifier to the nuclear gauge and relaying a summary of the determined geographic location of the nuclear gauge to a named recipient associated with the unique identifier.

13. A method according to claim 1, wherein the steps of mountning, obtaining and determining are carried out for a plurality of different nuclear gauges.

14. A method according to claim 13, further comprising automatically repeating the steps of obtaining and determining for each of the plurality of different nuclear gauges over time.

15. A method according to claim 14, further comprising generating electronic record data summnaries of the location of the nuclear gauges at desired intervals.

16. A method according to claim 1, further comprising defining at least one geographic virtual fence region associated with the nuclear gauge.

17. A method according to claim 16, further comprising monitoring the location of the nuclear gauge to determine whether the device remains within the geographic fence.

18. A method according to claim 17, wherein the virtual fence is a projected shipping corridor associated with the transport of the nuclear gauge from one site to a different site.

19. A method according to claim 17, further comprising automatically generating an alarn and/or alerting regulatory authorities upon detection of at least one of a predetermined operative or inoperative condition of the gauge, a missing radioactive component, when the gauge is outside the virtual fence, or when the tracking signal is unable to be obtained.

20. A method according to claim 1, further comprising remotely controlling the operation of the tracking device and/or the nuclear gauge.

21. A method according to claim 20, wherein the step of remotely controlling comprises activating and deactivating the nuclear gauge and/or the tracking device.

22. A method according to claim 21, wherein the deactivating step causes the nuclear gauge and/or the tracking device to go into a power saving mode.

23. A method according to claim 21, wherein the deactivating step disables or destroys the operational function of the nuclear gauge.

24. A method according to claim 1, further comprising relaying measurement data proximate in time to the collection thereof to a remote location.

25. A method according to claim 1, further comprising transmitting diagnostics or other selected data from the nuclear device to the remote location.

26. A method according to claim 1, further comprising automatically disabling the internal circuitry of the nuclear gauge upon the occurrence of at least one predetermined condition.

27. A method according to claim 1, further comprising generating an alert when the radioactive source is moved beyond predetermined boundaries or limits within or external to the housing of the device and/or when the nuclear gauge moves beyond a predetermined geographic region.

28. A method according to claim 27, wherein the alert is transmitted to selected authorities.

29. A method according to claim 27, wherein the alert is a sound alert generated to be externally audible relative to the proximity of the nuclear gauge.

30. A method according to claim 1, further comprising transporting the nuclear gauge and monitoring the nuclear gauge during transport by serially obtaining the at least one tracking signal and determining the location of the gauge as it progresses from its shipping location toward its projected destination.

31. A method according to claim 1, filrther comprising disabling the operational finction of the nuclear gauge upon the detection of a radiation count that is reduced from a predetermined value.

32. A method according to claim 1, further comprising disabling the operational function of the nuclear gauge upon detection that the radioactive component is outside predetermined geographic use and/or the boundaries of the housing.

33. A nuclear measurement gauge comprising:

a housing;

a radioactive source held inside of the housing;

a radioactive detector operably associated with the radioactive source;

electronic circuit that controls the operation of the nuclear gauge operably associated with the detector;

a power source operably associated with the detector and the controller;

a wireless communication system held in or proximate to the housing, wherein the wireless communication system is configured to provide a tracking signal that allows a remote location to determine the geographic location of the gauge; and a source count comparator module that compares the non-active measurement count to a predetermined value to assess whether the radioactive source is in the gauge during an operational service life.

34. A nuclear measurement gauge according to claim 33, further comprising an anti-theft module that is in communication with the operational electronic circuitry that disables selected components in the electronic circuitry upon the occurrence of predetermined conditions.

35. A nuclear measurement gauge according to claim 33, wherein the gauge generates an audible alarm when the radioactive source is determined to be missing from or displaced in the gauge during an operational service life.

36. A nuclear measurement gauge according to claim 33, wherein the wireless communication system is configured to operate over at least one satellite and/or mobile communication towers.

37. A nuclear measurement gauge according to claim 33, wherein the wireless communication system is integrated into the electronic operating circuitry of the gauge.

38. A nuclear measurement gauge according to claim 33, wherein the wireless communication system comprises a primary circuit board and an antenna.

39. A nuclear measurement gauge according to claim 38, wherein the wireless communication system is configured to communicate with the electronic circuitry, and wherein the wireless communication system includes a remote control interface module that allows a remote location to control or obtain data from the nuclear measurement gauge.

40. A nuclear measurement gauge according to claim 39, wherein the wireless communication system is configured to relay measurement data to a remote location.

41. A nuclear measurement gauge according to claim 39, wherein the wireless communication system is configured to receive remote commands and respond thereto.

42. A nuclear measurement gauge according to claim 41, wherein the wireless communication system is configured to transmit diagnostic data from the nuclear measurement device to the remote location.

43. A nuclear measurement gauge according to claim 39, wherein the wireless communication system is configured to allow remote activation and deactivation of the nuclear gauge and/or the wireless communication system.

44. A nuclear measurement gauge according to claim 43, wherein the deactivation causes the nuclear gauge and/or the wireless communication system to go into a power saving mode.

45. A nuclear measurement gauge according to claim 43, wherein the deactivation disables or destroys one or more components in the electronic circuitry to thereby disable or destroy the operational function of the nuclear gauge.

46. A nuclear measurement gauge according to claim 33, wherein the radioactive source comprises a gamma source and a neutron source.

47. A nuclear measurement gauge comprising:
a housing;
a radioactive source held inside of the housing;
a radioactive detector operably associated with the radioactive source;
electronic circuitry that controls the operation of the nuclear gauge operably associated with the detector;
a power source operably associated with the detector and the controller;
a wireless communication system held in or proximate to the housing, wherein the wireless communication system is configured to provide a tracking signal that allows a remote location to determine the geographic location of the gauge;
a tracking radiation monitor circuit configured to detect radiation counts in the nuclear gauge during an operational service life of the nuclear gauge; and
an anti-theft module that generates an audible alarm and/or disables the nuclear gauge responsive to data obtained from the tracking radiation monitor circuit.

48. A nuclear measurement gauge according to claim 47, further comprising a diagnostic interrogation interface circuit configured to transmit local operational and/or calibration data to the remote location.

49. A nuclear gauge according to claim 47, wherein the anti-theft module is configured to configured to disable battery power in the gauge.

50. A nuclear gauge according to claim 47, wherein the anti-theft module is configured to transmit a voltage or current sufficient to destroy a circuit in the gauge.

51. A nuclear gauge according to claim 47, wherein the gauge comprises a plurality of radiation detectors, including at least one for normal measurement operation using a measurement radiation circuit and detector and a different at least one at least one for the tracking radiation monitor circuit.

52. A nuclear gauge according to claim 51, wherein the tracking radiation monitor circuit is configured to obtain radiation count measurements during a non-active gauge measurement mode during the operational service life of the nuclear gauge.

53. A nuclear gauge according to claim 51, wherein the tracking radiation monitor circuit and the measurement radiation circuit can be independently monitored remotely.

54. A nuclear gauge according to claim 51, wherein the tracking radiation monitor circuit is configured to obtain gamma and neutron radiation counts substantially concurrently.

55. A nuclear measurement gauge comprising:
a housing;
a radioactive source held inside of the housing;
a radioactive detector operably associated with the radioactive source;
electronic circuitry that controls the operation of the nuclear gauge operably associated with the detector;
a power source operably associated with the detector and the controller; and
a wireless communication system held in or proximate to the housing, wherein the wireless communication system is configured to provide a tracking signal that allows a remote location to determine the geographic location of the gauge, and wherein the wireless communication system is configured to obtain a radioactive count from the detector during a non-active measurement period to determine whether the radioactive source is intact in the gauge.

56. A nuclear measurement gauge according to claim 55, wherein the non-active measurement is obtained proximate in time to providing the tracking signal.

57. A method for tracking the location of nuclear gauges comprising a radioactive component, comprising:
mounting a tracking device is proximity to a nuclear gauge having a radioactive component, the tracking device configured to provide at least one tracking signal that is detectable from a remote location to thereby allow its geographic location to be determined remotely, wherein the nuclear gauge is a portable nuclear measurement gauge comprising a gamma source and neutron source;

monitoring radiation counts associated with a radioactive source in the nuclear gauge during an operational service life;

carrying out a diagnostic interrogation based on local data from the nuclear gauge that is transmitted to the remote location;

measuring radioactivity using a count comparator module;

generates an audible alarm in the gauge itself if a theft condition is determined; and disabling the nuclear gauge if a theft condition is detected.

58. A method for tracking the location of nuclear gauges comprising a radioactive component, comprising:

mounting a tracking device is proximity to a nuclear gauge having a radioactive component, the tracking device configured to provide at least one tracking signal that is detectable from a remote location to thereby allow its geographic location to be determined remotely, obtaining the at least one tracking signal at a remote location;

determining the gegraphic location of the nuclear gauge;

wherein the steps of mounting, obtaining and determining are carried out for a plurality of different nuclear gauges;

automatically repeating the steps of obtaining and determining for each of the plurality of different nuclear gauges over time; and adjusting the obtaining and determining intervals based on an automated detection of movement of a radioactive source held in the nuclear gauge, and/or based on data from an automated measurement of a radioactive count associated with the radioactive source.

* * * * *

UNITED STATES PATENT AND TRADEMARK OFFICE
CERTIFICATE OF CORRECTION

PATENT NO. : 6,995,667 B2 Page 1 of 1
APPLICATION NO. : 10/3028063
DATED : February 7, 2006
INVENTOR(S) : He et al.

It is certified that error appears in the above-identified patent and that said Letters Patent is hereby corrected as shown below:

Column 22,
Line 62 should read -- that is detectable from a remote location to thereby --

Column 23,
Line 3 should read -- selectively adjusting the monitoring periods based on an automated detection of movement of a radioactive source held in the nuclear gauge, and/or based on data from an automated measurement of a radioactive count associated with the radioactive source. --

Line 30 should read -- 8. A method according to claim 4, further comprising --

Signed and Sealed this

First Day of August, 2006

JON W. DUDAS
*Director of the United States Patent and Trademark Office*

UNITED STATES PATENT AND TRADEMARK OFFICE
CERTIFICATE OF CORRECTION

PATENT NO. : 6,995,667 B2  Page 1 of 1
APPLICATION NO. : 10/328063
DATED : February 7, 2006
INVENTOR(S) : He et al.

It is certified that error appears in the above-identified patent and that said Letters Patent is hereby corrected as shown below:

Column 22,
Line 62 should read -- that is detectable from a remote location to thereby --

Column 23,
Line 3 should read -- selectively adjusting the monitoring periods based on an automated detection of movement of a radioactive source held in the nuclear gauge, and/or based on data from an automated measurement of a radioactive count associated with the radioactive source. --

Line 30 should read -- 8. A method according to claim 4, further comprising --

This certificate supersedes Certificate of Correction issued August 1, 2006.

Signed and Sealed this

Twelfth Day of September, 2006

JON W. DUDAS
*Director of the United States Patent and Trademark Office*